(12) United States Patent
Xu et al.

(10) Patent No.: US 11,290,206 B2
(45) Date of Patent: Mar. 29, 2022

(54) CHANNEL QUALITY INDICATOR FEEDBACK IN A NON-TERRESTRIAL NETWORK

(71) Applicant: QUALCOMM Incorporated, San Diego, CA (US)

(72) Inventors: Huilin Xu, San Diego, CA (US); Jun Ma, San Diego, CA (US); Xiao Feng Wang, San Diego, CA (US); Iyab Issam Sakhnini, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 16/814,653

(22) Filed: Mar. 10, 2020

(65) Prior Publication Data

US 2020/0313795 A1    Oct. 1, 2020

Related U.S. Application Data

(60) Provisional application No. 62/826,488, filed on Mar. 29, 2019.

(51) Int. Cl.
*H04L 1/00* (2006.01)
*H04L 5/00* (2006.01)
(Continued)

(52) U.S. Cl.
CPC ......... *H04L 1/0026* (2013.01); *H04B 7/0632* (2013.01); *H04L 1/0003* (2013.01);
(Continued)

(58) Field of Classification Search
CPC .................................................... H04L 1/0026
See application file for complete search history.

(56) References Cited

U.S. PATENT DOCUMENTS

2019/0349119 A1* 11/2019 Nammi ................. H04L 1/0058
2020/0007270 A1*  1/2020 Wikstrom ............. H04L 1/0009
(Continued)

FOREIGN PATENT DOCUMENTS

WO        2018127765 A1    7/2018

OTHER PUBLICATIONS

International Search Report and Written Opinion—PCT/US2020/021990—ISA/EPO—dated Jun. 18, 2020.
(Continued)

*Primary Examiner* — Jason E Mattis
(74) *Attorney, Agent, or Firm* — Harrity & Harrity, LLP

(57) ABSTRACT

In some aspects, a user equipment (UE) may receive a configuration from a base station that indicates whether to use a first channel quality indicator (CQI) table from a first set of CQI tables associated with terrestrial network communications or whether to use a second CQI table from a second set of CQI tables associated with non-terrestrial network communications. The UE may transmit CQI feedback to the base station based at least in part on the configuration. The UE may transmit the CQI feedback using the first CQI table when the configuration indicates that the first CQI table is to be used or may transmit the CQI feedback using the second CQI table when the configuration indicates that the second CQI table is to be used.

30 Claims, 11 Drawing Sheets

(51) Int. Cl.
*H04L 101/622* (2022.01)
*H04L 1/18* (2006.01)
*H04B 7/06* (2006.01)

(52) U.S. Cl.
CPC .......... *H04L 1/0016* (2013.01); *H04L 1/1812* (2013.01); *H04L 5/0057* (2013.01); *H04L 61/6022* (2013.01)

(56) References Cited

U.S. PATENT DOCUMENTS

| | | | |
|---|---|---|---|
| 2020/0412431 A1* | 12/2020 | Park | H04B 7/0469 |
| 2021/0175999 A1* | 6/2021 | Kittichokechai | H04L 1/0003 |
| 2021/0219228 A1* | 7/2021 | Matsuda | H04W 88/06 |

OTHER PUBLICATIONS

LG Electronics: "Discussions on CQI and MCS Tables", 3GPP Draft, 3GPP TSG RAN WG1 Meeting #90bis, R1-1717943, CQI and MCS, 3rd Generation Partnership Project (3GPP), Mobile Competence Centre, 650, Route Des Lucioles, F-06921 Sophia-Antipolis Ce, vol. RAN WG1, No. Prague, Czech, Republic, Oct. 9, 2017-Oct. 13, 2017, Oct. 3, 2017 (Oct. 3, 2017), XP051352824, 5 pages, Retrieved from the Internet: URL: http://www.3gpp.org/ftp/tsg_ran/WG1_RL1/TSGR1_90b/Docs/. [retrieved on Oct. 3, 2017] Sections 1 and 2.

MTT: "Discussion on CSI Feedback for LEO Satellites in NTN", 3GPP Draft, 3GPP TSG-RAN WG1 Meeting AH-1901, R1-1900819, Discussion on CSI Feedback for LEO Satellites in NTN, 3rd Generation Partnership Project (3GPP), Mobile Competence Centre, 650, Route Des Lucioles, F-06921 Sophia-Antipolis Ce, vol. RAN WG1, No. Taipei, Taiwan, Jan. 21, 2019-Jan. 25, 2019, Jan. 12, 2019 (Jan. 12, 2019). XP051576357, 11 pages.

VIVO: "Discussion on CSI Report for URLLC", 3GPP Draft, 3GPP TSG RAN WG1 Meeting #93, R1-1806077, Discussion on CSI Report for URLLC, 3rd Generation Partnership Project (3GPP), Mobile Competence Centre, 650, Route Des Lucioles, F-06921 Sophia-Antipolis Ce, vol. RAN WG1, No. Busan, Korea, May 21, 2018-May 25, 2018, May 20, 2018 (May 20, 2018), XP051441291, 2 pages, Retrieved from the Internet: URL: http://www.3gpp.org/ftp/Meetings%5F3GPP%5FSYNC/RAN1/Docs/. [retrieved on May 20, 2018] the whole document.

* cited by examiner

CHANNEL QUALITY INDICATOR FEEDBACK IN A NON-TERRESTRIAL NETWORK

CROSS-REFERENCE TO RELATED APPLICATION

This Patent Application claims priority to U.S. Provisional Patent Application No. 62/826,488, filed one Mar. 29, 2019, entitled "CHANNEL QUALITY INDICATOR FEEDBACK IN A NON-TERRESTRIAL NETWORK," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for channel quality indicator feedback in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a terrestrial network, data loss due to changing channel conditions can be mitigated by using hybrid automatic repeat request (HARQ) feedback. For example, a terrestrial network may permit a relatively large number of HARQ retransmissions, such as eight HARQ retransmissions per HARQ process. As a result, if channel conditions change in a manner such that the UE cannot successfully receive a downlink data communication at the current modulation and coding scheme (MCS), the downlink data communication can be retransmitted, potentially using a different MCS than that used for the prior transmission. However, in a non-terrestrial network, permitting a large number of HARQ retransmissions may be inefficient due to long communication delays. Thus, in a non-terrestrial network, the number of HARQ retransmissions may be limited or in some instances disabled. With a low number of HARQ retransmissions or with HARQ retransmission disabled, inaccurate channel quality indicator (CQI) reporting significantly degrades spectral efficiency. For example, if the reported CQI indicates a better channel condition than an actual channel condition, a base station may select an aggressive MCS that cannot be supported by the channel conditions resulting in a failure of the UE to successfully receive the communication, which may lead to a high block error rate (BLER) and lower throughput. Conversely, if the reported CQI indicates a worse channel condition than an actual channel condition, the base station 110 may select a conservative MCS that may waste network resources, also leading to lower throughput.

SUMMARY

In some aspects, a method of wireless communication, performed by a user equipment (UE), may include receiving a configuration from a base station that indicates whether to use a first channel quality indicator (CQI) table from a first set of CQI tables associated with terrestrial network communications or whether to use a second CQI table from a second set of CQI tables associated with non-terrestrial network communications; and transmitting CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used.

In some aspects, a method of wireless communication, performed by a UE, may include receiving a configuration from a base station that indicates a non-terrestrial network CQI table to be used by the UE, wherein the non-terrestrial network CQI table includes at least one of more CQI indexes than a terrestrial network CQI table, different modulation and coding scheme (MCS) mappings than a terrestrial network CQI table, an association with a different block error rate (BLER) target than a terrestrial network CQI table, or a combination thereof; and transmitting CQI feedback to the base station based at least in part on the indicated non-terrestrial network CQI table.

In some aspects, a UE for wireless communication may include memory and one or more processors operatively coupled to the memory. The memory and the one or more processors may be configured to receive a configuration from a base station that indicates whether to use a first CQI table from a first set of CQI tables associated with terrestrial network communications or whether to use a second CQI table from a second set of CQI tables associated with non-terrestrial network communications; and transmit CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used.

In some aspects, a UE for wireless communication may include memory and one or more processors operatively coupled to the memory. The memory and the one or more processors may be configured to receive a configuration from a base station that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; and transmit CQI feedback to the base station based at least in part on the indicated non-terrestrial network CQI table.

In some aspects, a non-transitory computer-readable medium may store one or more instructions for wireless communication. The one or more instructions, when executed by one or more processors of a UE, may cause the one or more processors to: receive a configuration from a base station that indicates whether to use a first CQI table from a first set of CQI tables associated with terrestrial network communications or whether to use a second CQI table from a second set of CQI tables associated with non-terrestrial network communications; and transmit CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used.

In some aspects, a non-transitory computer-readable medium may store one or more instructions for wireless communication. The one or more instructions, when executed by one or more processors of a UE, may cause the one or more processors to: receive a configuration from a base station that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; and transmit CQI feedback to the base station based at least in part on the indicated non-terrestrial network CQI table.

In some aspects, an apparatus for wireless communication may include means for receiving a configuration from a base station that indicates whether to use a first CQI table from a first set of CQI tables associated with terrestrial network communications or whether to use a second CQI table from a second set of CQI tables associated with non-terrestrial network communications; and means for transmitting CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used.

In some aspects, an apparatus for wireless communication may include means for receiving a configuration from a base station that indicates a non-terrestrial network CQI table to be used by the apparatus, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; and means for transmitting CQI feedback to the base station based at least in part on the indicated non-terrestrial network CQI table.

In some aspects, a method of wireless communication, performed by a base station, may include transmitting a configuration to a UE that indicates whether to use a first CQI table from a first set of CQI tables associated with terrestrial network communications or whether to use a second CQI table from a second set of CQI tables associated with non-terrestrial network communications; receiving CQI feedback from the UE; and interpreting the CQI feedback based at least in part on the configuration, wherein the CQI feedback is interpreted using the first CQI table when the configuration indicates that the first CQI table is to be used or is interpreted using the second CQI table when the configuration indicates that the second CQI table is to be used.

In some aspects, a method of wireless communication, performed by a base station, may include transmitting a configuration to a UE that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; receiving CQI feedback from the UE; and interpreting the CQI feedback based at least in part on the indicated non-terrestrial network CQI table.

In some aspects, a base station for wireless communication may include memory and one or more processors operatively coupled to the memory. The memory and the one or more processors may be configured to transmit a configuration to a UE that indicates whether to use a first CQI table from a first set of CQI tables associated with terrestrial network communications or whether to use a second CQI table from a second set of CQI tables associated with non-terrestrial network communications; receive CQI feedback from the UE; and interpret the CQI feedback based at least in part on the configuration, wherein the CQI feedback is interpreted using the first CQI table when the configuration indicates that the first CQI table is to be used or is interpreted using the second CQI table when the configuration indicates that the second CQI table is to be used.

In some aspects, a base station for wireless communication may include memory and one or more processors operatively coupled to the memory. The memory and the one or more processors may be configured to transmit a configuration to a UE that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; receive CQI feedback from the UE; and interpret the CQI feedback based at least in part on the indicated non-terrestrial network CQI table.

In some aspects, a non-transitory computer-readable medium may store one or more instructions for wireless communication. The one or more instructions, when executed by one or more processors of a base station, may cause the one or more processors to: transmit a configuration to a UE that indicates whether to use a first CQI table from a first set of CQI tables associated with terrestrial network communications or whether to use a second CQI table from a second set of CQI tables associated with non-terrestrial network communications; receive CQI feedback from the UE; and interpret the CQI feedback based at least in part on the configuration, wherein the CQI feedback is interpreted using the first CQI table when the configuration indicates that the first CQI table is to be used or is interpreted using the second CQI table when the configuration indicates that the second CQI table is to be used.

In some aspects, a non-transitory computer-readable medium may store one or more instructions for wireless communication. The one or more instructions, when executed by one or more processors of a base station, may cause the one or more processors to: transmit a configuration to a UE that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; receive CQI feedback from the UE; and interpret the CQI feedback based at least in part on the indicated non-terrestrial network CQI table.

In some aspects, an apparatus for wireless communication may include means for transmitting a configuration to a UE that indicates whether to use a first CQI table from a first set of CQI tables associated with terrestrial network communications or whether to use a second CQI table from a second set of CQI tables associated with non-terrestrial network communications; means for receiving CQI feedback from the UE; and means for interpreting the CQI feedback based at least in part on the configuration, wherein the CQI feedback is interpreted using the first CQI table when the configuration indicates that the first CQI table is to be used or is interpreted using the second CQI table when the configuration indicates that the second CQI table is to be used.

In some aspects, an apparatus for wireless communication may include means for transmitting a configuration to a UE that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; means for receiving CQI feedback from the UE; and means for interpreting the CQI feedback based at least in part on the indicated non-terrestrial network CQI table.

Aspects generally include a method, apparatus, system, computer program product, non-transitory computer-readable medium, user equipment, base station, wireless communication device, or processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
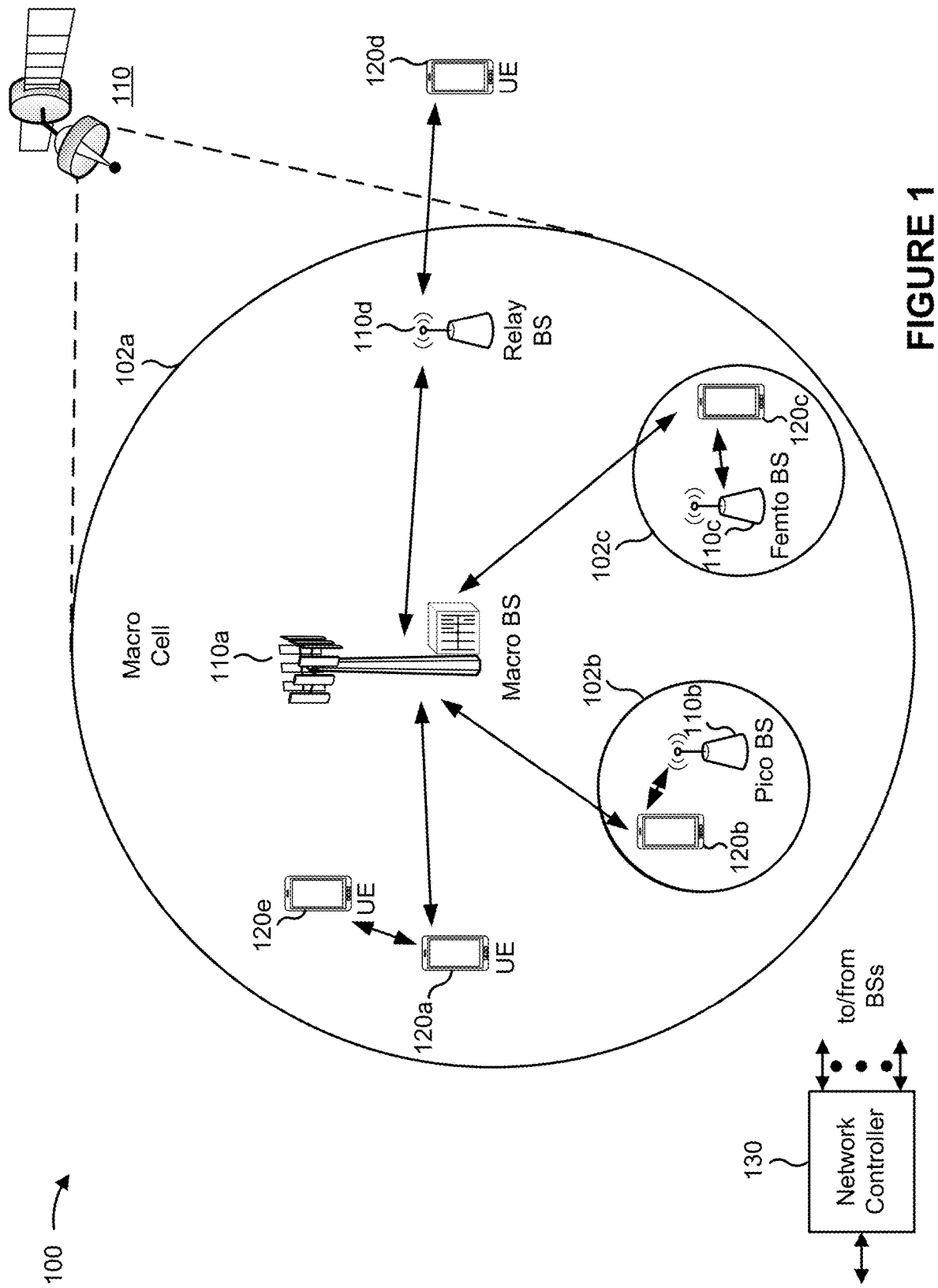
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

In a terrestrial network, data loss due to changing channel conditions can be mitigated by using hybrid automatic repeat request (HARQ) feedback. For example, a terrestrial network may permit a relatively large number of HARQ retransmissions, such as eight HARQ retransmissions per HARQ process. As a result, if channel conditions change in a manner such that the UE cannot successfully receive a downlink data communication at the current modulation and coding scheme (MCS), the downlink data communication can be retransmitted, potentially using a different MCS than that used for the prior transmission. However, in a non-terrestrial network, permitting a large number of HARQ retransmissions may be inefficient due to long communication delays. Thus, in a non-terrestrial network, the number of HARQ retransmissions may be limited or in some instances disabled. With a low number of HARQ retransmissions or with HARQ retransmission disabled, inaccurate channel quality indicator (CQI) reporting significantly degrades spectral efficiency. For example, if the reported CQI indicates a better channel condition than an actual channel condition, a base station may select an aggressive MCS that cannot be supported by the channel conditions resulting in a failure of the UE to successfully receive the communication, which may lead to a high block error rate (BLER) and lower throughput. Conversely, if the reported CQI indicates a worse channel condition than an actual channel condition, the base station 110 may select a conservative MCS that may waste network resources, also leading to lower throughput.

Thus, CQI reporting with finer granularity may be needed in a non-terrestrial network to achieve the appropriate tradeoff between throughput and likelihood of successful transmission in a non-terrestrial network. Because channels of a non-terrestrial network operate using line-of-sight communication (for example, between a UE and a non-terrestrial base station), the channels typically vary slowly over time with predictable interference or noise (for example, due to additive white Gaussian noise (AWGN)). As a result, future channel conditions in a non-terrestrial network may be accurately predicted due to a low likelihood that channel conditions will change between a time when the UE measures a channel condition and a time when a non-terrestrial base station transmits a downlink data communication using an MCS determined based at least in part on that channel condition. Thus, reporting CQI with finer granularity may lead to performance improvements. Some techniques and apparatuses described herein permit CQI reporting that more accurately represents actual channel conditions for a non-terrestrial network, thereby reducing latency, increasing throughput, and improving spectral efficiency in a non-terrestrial network. Furthermore, some techniques and apparatuses described herein allow for appropriate and flexible configuration of CQI reporting using different granularities to permit co-existence between terrestrial networks and non-terrestrial networks.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

In some examples, a cell may be provided by a base station 110 of a non-terrestrial network, also referred to as a non-terrestrial base station 110 or a non-terrestrial access point. As used herein, a non-terrestrial network may refer to a network for which access is provided by a non-terrestrial base station 110. In some aspects, a non-terrestrial base station 110 may be located on an airborne vehicle or a vehicle in orbit, such as a satellite, a balloon, a dirigible, an airplane, an unmanned aerial vehicle, a drone, or the like. Additionally or alternatively, a non-terrestrial base station 110 may act as a relay station to relay communications between a UE 120 and a terrestrial base station 110 (such as a base station 110 located on the ground), as described below. In some aspects, a UE 120 may be a ground station (GS).

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
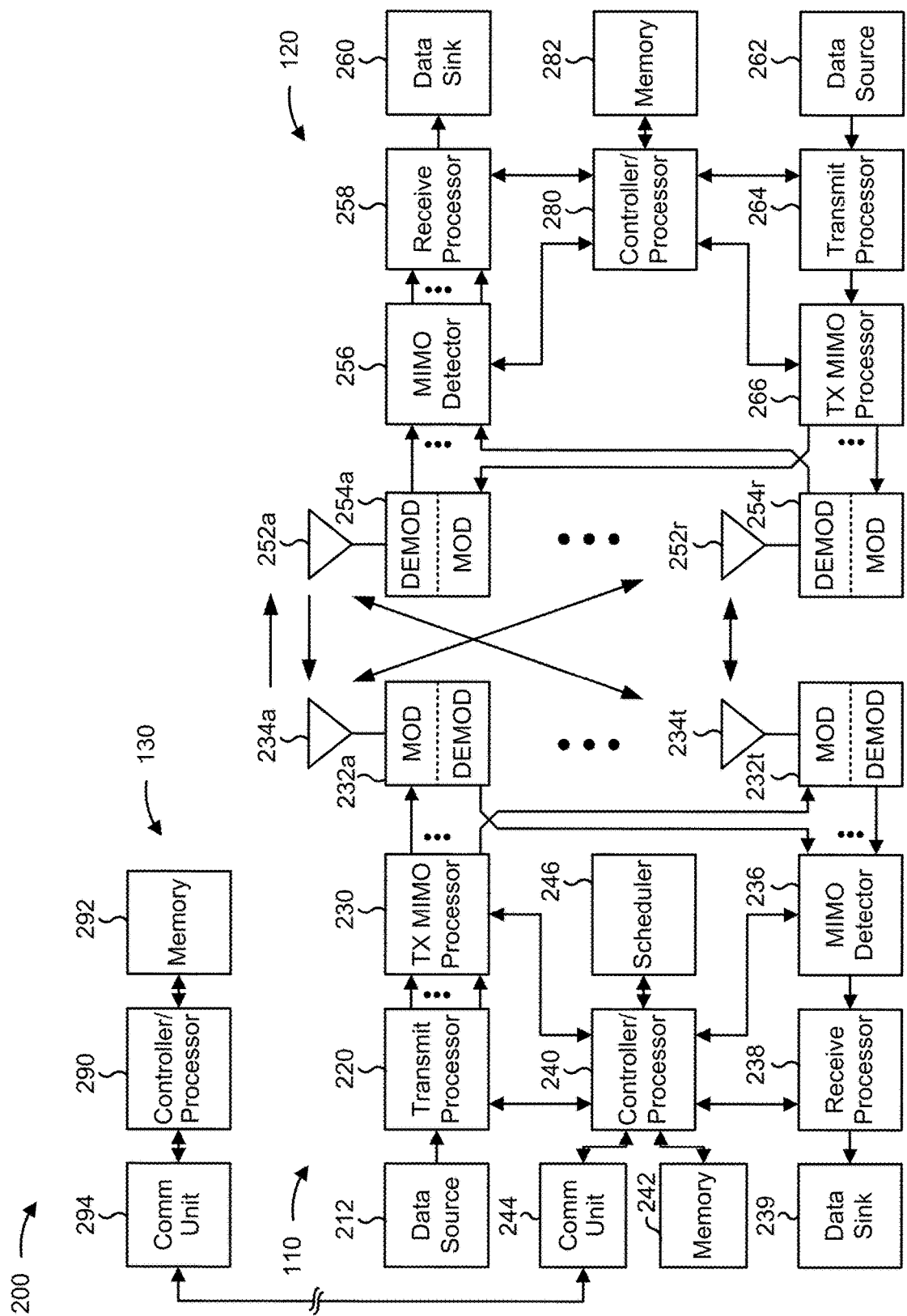
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with CQI feedback in a non-terrestrial network, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink or uplink.

In some aspects, the UE 120 may include means for receiving a configuration from a base station that indicates whether to use a first CQI table from a first set of CQI tables associated with terrestrial network communications or whether to use a second CQI table from a second set of CQI tables associated with non-terrestrial network communications; means for transmitting CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used; or the like or combinations thereof. Additionally or alternatively, the UE 120 may include means for receiving a configuration from a base station that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; means for transmitting CQI feedback to the base station based at least in part on the indicated non-terrestrial network CQI table; or the like or combinations thereof. In some aspects, such means may include one or more components of UE 120 described in connection with FIG. 2.

In some aspects, the base station 110 may include means for transmitting a configuration to a UE that indicates whether to use a first CQI table from a first set of CQI tables associated with terrestrial network communications or whether to use a second CQI table from a second set of CQI tables associated with non-terrestrial network communications; means for receiving CQI feedback from the UE; means for interpreting the CQI feedback based at least in part on the configuration, wherein the CQI feedback is interpreted using the first CQI table when the configuration indicates that the first CQI table is to be used or is interpreted using the second CQI table when the configuration indicates that the second CQI table is to be used; or the like or combinations thereof. Additionally or alternatively, the base station 110 may includes means for transmitting a configuration to a UE that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof; means for receiving CQI feedback from the UE; means for interpreting the CQI feedback based at least in part on the indicated non-terrestrial network CQI table; or the like or combinations thereof. In some aspects, such means may include one or more components of base station 110 described in connection with FIG. 2.

Figure 3:
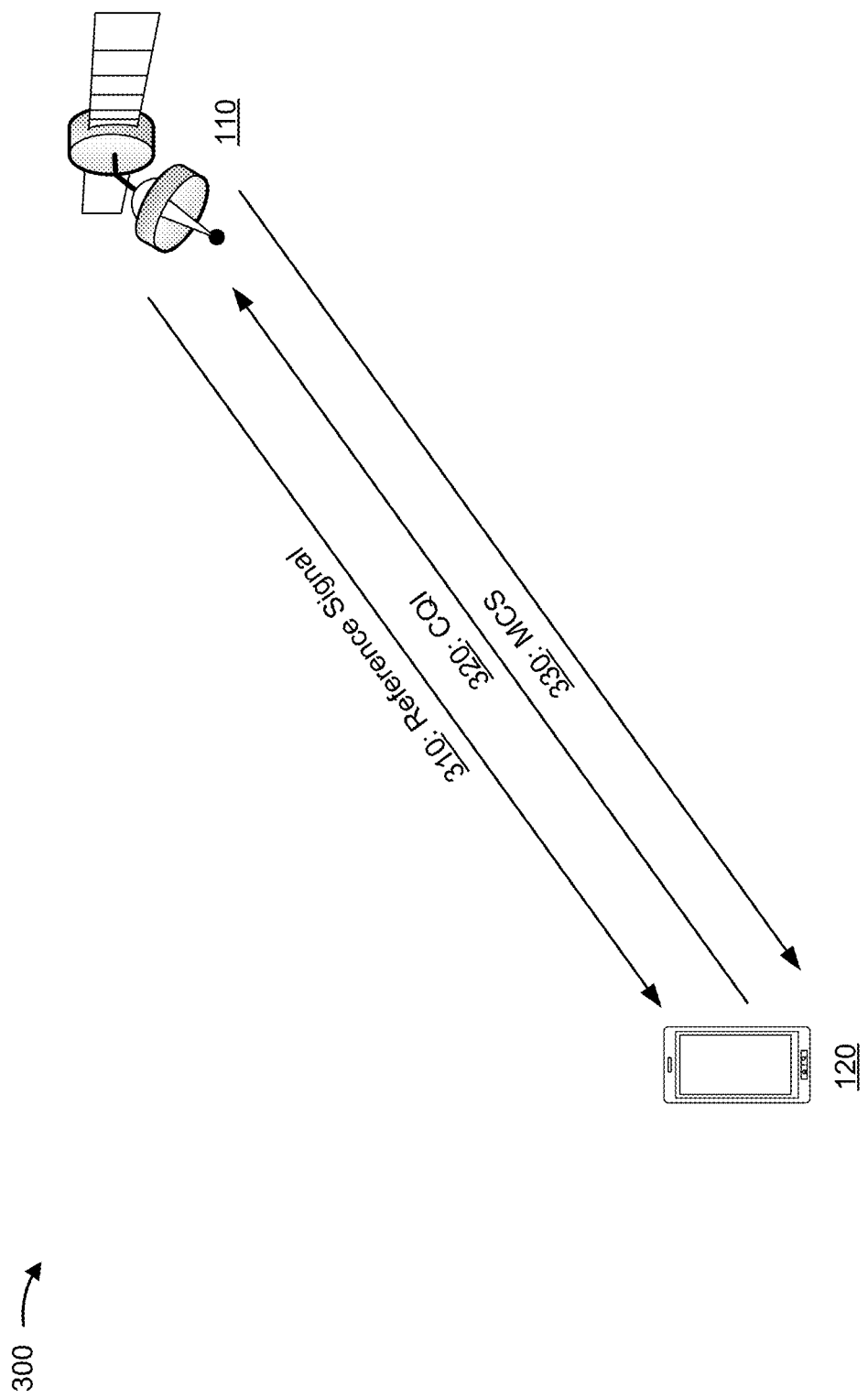
FIG. 3 is a diagram illustrating an example of a channel quality indicator (CQI) feedback procedure in a non-terrestrial network in accordance with various aspects of the present disclosure.

FIG. 3 is a diagram illustrating an example 300 of a CQI feedback procedure in a non-terrestrial network in accordance with various aspects of the present disclosure. As shown in FIG. 3, a UE 120 and a non-terrestrial (NT) base station 110 may communicate with one another. In some aspects, the UE 120 may be a ground station.

In a first operation 310, the NT base station 110 may transmit a reference signal, such as a channel state information (CSI) reference signal (CSI-RS), which may be received by the UE 120. In some cases, the NT base station 110 may transmit multiple reference signals for a channel. The UE 120 may measure the received reference signal(s), and use the reference signal measurements to determine a CQI index that represents a quality of the channel. For example, the UE 120 may measure or process the reference signal(s) to determine a signal-to-interference-plus-noise ratio (SINR) for the channel, and may use the SINR to determine the CQI index for the channel. In some aspects, the UE 120 may map the SINR to a CQI index. For example, different ranges of SINR values may be associated with different CQI indexes and the UE 120 may map the determined SINR to a particular CQI index based on the respective range of SINR values the determined SINR is in.

In a second operation 320, the UE 120 may transmit the determined CQI index to the NT base station 110. For example, the UE 120 may transmit the CQI index as CQI feedback, which may be transmitted in a channel state information (CSI) report. The NT base station 110 may determine a modulation and coding scheme (MCS) to be used to modulate and encode downlink communications for the UE 120 based at least in part on the CQI index. For example, the CQI index may map to an MCS index that indicates a modulation scheme, a modulation order, a target code rate, or the like. In this way, a lower order MCS (for example, a less complex MCS, an MCS that carries fewer bits per symbol, or the like) may be used to improve the likelihood of successful demodulation and decoding when channel conditions are poor, and a higher order MCS (for example, a more complex MCS, an MCS that carries more bits per symbol, or the like) may be used to increase throughput and spectral efficiency when channel conditions permit.

In a third operation 330, the NT base station 110 may indicate, to the UE 120, the MCS used to modulate and encode a downlink communication, such as by indicating an MCS index. For example, the MCS may be indicated in downlink control information (DCI) of a downlink control channel (such as a physical downlink control channel (PDCCH)), such as a downlink grant for a downlink data communication. The NT base station 110 may then transmit the downlink data communication, modulated and encoded according to the MCS, in a downlink data channel (such as a physical downlink shared channel (PDSCH)). The UE 120 may use the indicated MCS to demodulate and decode the downlink data communication.

To reduce signaling overhead needed to indicate channel quality, a finite number of CQI indexes are defined, which may be less than the number of defined MCS indexes. For example, in LTE and NR, four bits are used to signal the CQI index, limiting the number of possible CQI indexes to 16 (with some CQI index values being potentially reserved). However, in LTE and NR, the MCS index is indicated using five bits, and as such, there are 32 possible MCSs (with some MCS index values being potentially reserved). In a terrestrial network where channel fading is prevalent, the number of CQI indexes is less than the number of MCS indexes because the performance improvement of highly accurate CQI measurements is limited due to changing channel conditions over time. More specifically, due to channel fading in terrestrial networks, there is a relatively high likelihood that channel conditions will change between a time when the UE 120 measures a channel condition and a time when a terrestrial base station 110 transmits a downlink data communication using an MCS determined based at least in part on that channel condition. In other words, due to channel fading, MCS selection algorithms cannot rely on predictions of future channel conditions in a terrestrial network.

In a terrestrial network, data loss due to changing channel conditions can be mitigated by using hybrid automatic repeat request (HARQ) feedback. For example, a terrestrial network may permit a relatively large number of HARQ retransmissions, such as 8 HARQ retransmissions per HARQ process. As a result, if channel conditions change in a manner such that the UE 120 cannot successfully receive a downlink data communication at the current MCS, the downlink data communication can be retransmitted, potentially using a different MCS than that used for the prior transmission. With relatively low CQI granularity as, for example, compared to MCS granularity, a reported CQI index may be more optimistic than an actual channel quality measurement in some cases. For example, a reported CQI index may indicate a better channel quality than a measured channel quality due to a lack of a CQI index that more accurately indicates the measured channel quality. In this case, a HARQ process may use a greater number of HARQ retransmissions, such as when the UE 120 is unable to successfully receive downlink data. In other cases, low CQI granularity may result in a reported CQI that is more pessimistic than an actual channel quality measurement. For example, a reported CQI index may indicate a worse channel quality than a measured channel quality due to a lack of a CQI index that more accurately indicates the measured channel quality. In this case, a HARQ process may use a smaller number of HARQ retransmissions. In either case (for example, more optimistic or more pessimistic CQI reporting), because of the relatively large number of permitted HARQ retransmissions, reporting CQI using a low granularity results in only a small loss in spectral efficiency in a terrestrial network.

However, in a non-terrestrial network, permitting a large number of HARQ retransmissions may be inefficient. For example, in a non-terrestrial network, communication delays between the transmission of a communication and the reception of a communication are much larger than in a terrestrial network because a UE 120 and an NTN base station 110 are located much farther apart than a UE 120 and a terrestrial base station 110. As a result, permitting a large number of HARQ retransmissions may lead to very large latencies due to long communication delays for an initial transmission, long communication delays for a negative acknowledgement (NACK) transmission when the initial transmission is not successfully received, long communication delays in transmitting control information and a retransmission, or the like. Latency may be further increased if retransmissions are unsuccessful. Thus, in a non-terrestrial network, the number of HARQ retransmissions may be limited (for example, to less than 8) or even disabled.

By limiting the number of, or disabling, HARQ retransmissions, inaccurate CQI reporting may significantly degrade spectral efficiency. For example, if the reported CQI indicates a better channel condition than an actual channel condition, the base station 110 may select an aggressive MCS for downlink communications but channel conditions may not permit the use of such an aggressive MCS and, as a result, the UE 120 may not successfully receive the downlink communications leading to a high block error rate (BLER) and lower throughput. Conversely, if reported CQI indicates a worse channel condition than an actual channel condition, the base station 110 may select an MCS that is too conservative and as such waste network resources, also leading to lower throughput (for example, due to using additional resources that could have been used for other transmissions). Thus, CQI reporting with finer granularity may be needed in a non-terrestrial network to achieve the appropriate tradeoff between throughput and the likelihood of successful transmission in a non-terrestrial network. Because channels of a non-terrestrial network are typically line-of-sight (for example, between a UE 120 and a NT base station 110), the channels typically vary regularly over time with predictable attenuation or noise (for example, due to additive white Gaussian noise (AWGN)). As a result, future channel conditions in a non-terrestrial network may be accurately predicted due to a low likelihood that channel conditions will change abruptly between a time when the UE 120 measures a channel condition and a time when a non-terrestrial base station 110 transmits a downlink data communication using an MCS determined based at least in part on that channel condition. Thus, reporting CQI with finer granularity may lead to performance improvements in non-terrestrial networks.

Some techniques and apparatuses described herein permit CQI reporting that more accurately represents actual channel conditions for a non-terrestrial network, thereby reducing latency, increasing throughput, and improving spectral efficiency in a non-terrestrial network. Furthermore, some techniques and apparatuses described herein allow for appropriate and flexible configuration of CQI reporting using different granularities to enhance coexistence between terrestrial networks and non-terrestrial networks.

Figure 4:
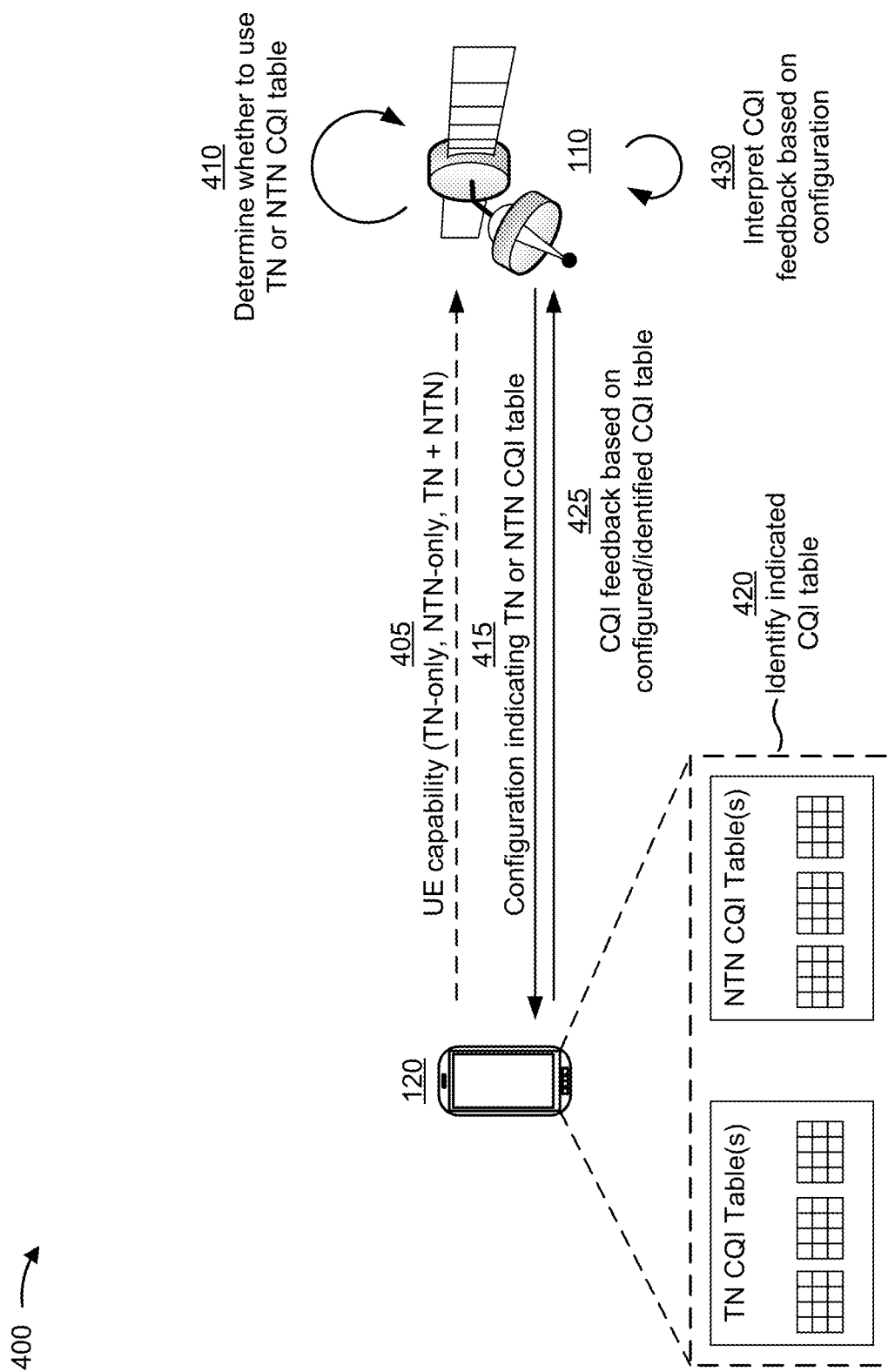
FIGS. 4 and 5 are diagrams illustrating examples of CQI feedback in a non-terrestrial network in accordance with various aspects of the present disclosure.

FIG. 4 is a diagram illustrating an example 400 of CQI feedback in a non-terrestrial network in accordance with various aspects of the present disclosure. As shown in FIG. 4, a UE 120 and a non-terrestrial (NT) base station 110 may communicate with one another.

In a first operation 405, the UE 120 may indicate a UE capability to the base station 110. The UE capability may indicate whether the UE 120 supports one or both of terrestrial network (TN) communications and non-terrestrial network (NTN) communications. For example, the UE 120 may determine whether the UE 120 supports both TN communications and NTN communications (shown as TN+NTN), whether the UE 120 supports NTN communications and not TN communications (shown as NTN-only), or whether the UE 120 supports TN communications and not NTN communications (shown as TN-only). In some aspects, the UE capability may be programmed into the UE 120. Additionally or alternatively, the UE capability may be based at least in part on a category or type of the UE 120.

In a second operation 410, the base station 110 may determine whether to use a TN CQI table or an NTN CQI table for CQI reporting. In some aspects, the base station 110 may determine the configuration based at least in part on the UE capability. For example, The base station 110 may determine whether to configure the UE 120 with a TN CQI table or an NTN CQI table based at least in part on the UE capability. Additionally or alternatively, the base station 110 may determine whether to configure the UE 120 with a TN CQI table or an NTN CQI table based at least in part on whether the base station 110 is a terrestrial base station or a non-terrestrial base station. However, in some aspects, the base station 110 may determine the configuration independent of the UE capability or independent of whether the base station 110 is a terrestrial base station or a non-terrestrial base station.

As an example, if the UE 120 supports both TN and NTN communications and the base station 110 is a terrestrial base station, then the base station 110 may configure the UE 120 with a TN CQI table. As another example, if the UE 120 supports both TN and NTN communications and the base station 110 is a non-terrestrial base station, then the base station 110 may configure the UE 120 with an NTN CQI table. As another example, if the UE 120 is an NTN-only UE 120 (meaning that the UE 120 supports NTN communications and not TN communications), then the base station 110 may configure the UE 120 with an NTN CQI table (for example, when the base station 110 is a non-terrestrial base station).

Additionally or alternatively, the base station 110 may determine the configuration based at least in part on a quality of service (QoS) requirement for a data communication (for example, an NTN data communication) associated with the UE 120, such as a data communication that uses an MCS that depends on CQI feedback transmitted by the UE 120. For example, the base station 110 may configure the UE 120 with an NTN CQI table for a high QoS requirement (that satisfies a threshold) because the NTN CQI table may result in lower latency, improved throughput, higher reliability, or the like, as compared to a TN CQI table, as described above in connection with FIG. 3. Conversely, the base station 110 may configure the UE 120 with a TN CQI table for a low QoS requirement (that does not satisfy a threshold) because the TN CQI table may be associated with more relaxed QoS requirements as compared to an NTN CQI table. In some aspects, to reduce signaling overhead, the base station 110 may configure the UE 120 with a TN CQI table for a low QoS requirement even if the UE 120 supports NTN communications and the base station 110 is a non-terrestrial base station (for example, even if the UE 120 is connected to an NTN).

Additionally or alternatively, the base station 110 may determine the configuration based at least in part on a HARQ configuration for the UE 120. For example, the base station 110 may configure the UE 120 with a TN CQI table if the UE 120 is configured with a number of HARQ retransmissions that satisfies a threshold (for example, that is greater than or equal to a threshold) because the relative inaccuracy of CQI feedback associated with TN CQI tables may be mitigated using HARQ retransmissions, as described above in connection with FIG. 3. Conversely, the base station 110 may configure the UE 120 with an NTN CQI table if the UE 120 is configured with a number of HARQ retransmissions that does not satisfy a threshold (for example, that is less than or equal to a threshold) because potential data loss due to a lack of or a low number of HARQ retransmissions may be mitigated by using relatively accurate CQI feedback associated with NTN CQI tables. In some aspects, the base station 110 may determine the HARQ configuration based at least in part on a HARQ capability of the UE 120, which may be signaled to the base station 110 in a UE capability report. In some aspects, to reduce signaling overhead, the base station 110 may configure the UE 120 with a TN CQI table when the number of HARQ retransmissions configured for the UE 120 satisfies a threshold even if the UE 120 supports NTN communications and the base station 110 is a non-terrestrial base station (for example, even if the UE 120 is connected to an NTN).

Additionally or alternatively, the base station 110 may determine the configuration based at least in part on an NTN deployment type associated with the base station 110. An NTN deployment type may include, for example, a low Earth orbit (LEO) deployment type (for example, with an altitude below 2,000 kilometers (km)), a medium Earth orbit (MEO) deployment type (for example, with an altitude from 2,000 km to below approximately 35,786 km), a geosynchronous orbit (GSO) or geostationary orbit (GEO) deployment type (for example, that matches Earth's sidereal rotation period with an altitude of approximately 35,786 km), a high Earth orbit (HEO) deployment type (for example, with an altitude above approximately 35,786 km), a deployment with an orbit that satisfies one or more thresholds (for example, that is less than or equal to an altitude threshold, that is greater than or equal to an altitude threshold, that is less than or equal to a first altitude threshold and greater than or equal to a second altitude threshold, or the like), a deployment with a beam footprint that satisfies one or more thresholds (for example, with a beam coverage diameter that is less than or equal to a threshold, that is greater than or equal to a threshold, that is less than or equal to a first threshold and greater than or equal to a second threshold, or the like), or the like. Additionally or alternatively, the base station 110 may determine the configuration based at least in part on channel characteristics (for example, whether the channel experiences channel fading). In some aspects, the channel characteristics may depend on the NTN deployment type.

For example, a GEO base station may determine to use an NTN CQI table with more CQI levels than a TN CQI table and a target BLER of 1e-5. As another example, a high altitude drone may determine to use a TN CQI table. As another example, a LEO base station may determine to use a different NTN CQI table than the GEO base station, such as an NTN CQI table with more CQI levels (for example, more CQI indexes) and a target BLER ranging from 1e-1, 1e-3, or 1e-5.

In some aspects, the set of TN CQI tables and the set of NTN CQI tables may be mutually exclusive. As described in more detail below, the set of TN CQI tables and the set of NTN CQI tables may have different characteristics. For example, an NTN CQI table may include more CQI indexes than a TN CQI table, may include different MCS mappings than a TN CQI table (for a same number of CQI indexes or a different number of CQI indexes as the TN CQI table), may be associated with a different BLER target than a terrestrial network CQI table, may be associated with different coding rates than a TN CQI table (for a same number of CQI indexes or a different number of CQI indexes as the TN CQI table), may be associated with a different reference resource allocation than a TN CQI table, or the like. Different CQI tables in a set of CQI tables may correspond to different BLER targets, different sets of modulation schemes, different sets of code rates, different sets of spectral efficiencies, or the like.

In a third operation 415, the base station 110 may transmit, to the UE 120, a configuration that indicates whether to use a TN CQI table (for example, a first CQI table) or an NTN CQI table (for example, a second CQI table). The TN CQI table may be included in a set of TN CQI tables (for example, a first set of CQI tables associated with TN communications). Similarly, the NTN CQI table may be included in a set of NTN CQI tables (for example, a second set of CQI tables associated with NTN communications).

In some aspects, the configuration indicating whether to use a TN CQI table or an NTN CQI table may be cell-specific. In this case, all UEs 120 in a cell are configured to use only TN CQI tables or only NTN CQI tables, and different UEs 120 in the cell may not be configured to use different types of CQI tables. In some aspects, the configuration of whether to use a TN CQI table or an NTN CQI table in the cell may change over time, but at any one time, all UEs 120 in the cell are configured to use the same type of CQI table (for example, either TN-only or NTN-only). For cell-specific CQI tables, UEs 120 in different cells may use the same or different CQI tables. In some aspects, for cell-specific CQI tables, the configuration may be indicated in system information (for example, in a system information block (SIB)), in a radio resource control (RRC) message, or the like. In this way, a UE 120 that is handed over from an NTN cell to a TN cell, or vice versa, may be configured with an appropriate CQI table.

In some aspects, the configuration indicating whether to use a TN CQI table or an NTN CQI table may be beam-specific. In this case, all UEs 120 that communicate with the base station 110 using a specific beam are configured to use only TN CQI tables or only NTN CQI tables, and different UEs 120 that communicate using the beam may not be configured to use different types of CQI tables. In some aspects, the configuration of whether to use a TN CQI table or an NTN CQI table for the beam may change over time, in a similar manner as indicated above. For beam-specific CQI tables, UEs 120 that use different beams may use the same or different CQI tables. In some aspects, for beam-specific CQI tables, the configuration may be indicated in an RRC message, in a medium access control (MAC) control element (CE) (MAC-CE), or the like.

In some aspects, the configuration indicating whether to use a TN CQI table or an NTN CQI table may be group-specific (for example, UE group-specific). In this case, all UEs 120 in a configured UE group are configured to use only TN CQI tables or only NTN CQI tables, and different UEs 120 in the UE group may not be configured to use different types of CQI tables. In some aspects, the configuration of whether to use a TN CQI table or an NTN CQI table for the group may change over time, in a similar manner as indicated above. For group-specific CQI tables, UEs 120 in different groups may use the same or different CQI tables. In some aspects, for group-specific CQI tables, the configuration may be indicated in group-common DCI, sometimes referred to as a group-common PDCCH communication. For example, the group-common DCI may include multiple CQI table indicators. Each CQI table indicator may indicate whether a group of UEs 120, corresponding to that CQI table indicator, are to use TN CQI tables or NTN CQI tables. The base station 110 may indicate, to a UE 120, which CQI table indicator in the group-common DCI corresponds to that UE 120. In some aspects, the indication of a correspondence between a UE 120 and a CQI table indicator (or a group to which the UE 120 belongs) may be indicated in an RRC message transmitted to the UE 120.

In some aspects, the configuration indicating whether to use a TN CQI table or an NTN CQI table may be UE-specific. In this case, individual UEs 120 may be configured to use either a TN CQI table or an NTN CQI table. In some aspects, the configuration of whether to use a TN CQI table or an NTN CQI table for the UE 120 may change over time, in a similar manner as indicated above. For UE-specific CQI tables, different UEs 120 may be configured to use the same or different CQI tables. In some aspects, for UE-specific CQI tables, the configuration may be indicated in an RRC message, in DCI (sometimes referred to as a PDCCH communication), or the like. For example, a base station 110 may transmit an aperiodic CSI request on the PDCCH to request the UE 120 to transmit aperiodic CSI, including a CQI index. In some aspects, the aperiodic CSI request may include a CQI table indicator that indicates whether the CQI index for the aperiodic CSI is to be determined using a TN CQI table or an NTN CQI table. In this way, the UE 120 may be dynamically configured on a per-aperiodic CSI basis.

In a fourth operation 420, the UE 120 may identify the CQI table indicated by the base station 110 in the configuration. For example, the UE 120 may identify a TN CQI table, from a set of stored TN CQI tables, or may identify an NTN CQI table from a set of stored NTN CQI tables. In some aspects, the UE 120 may store a set of TN CQI tables and not a set of NTN CQI tables, may store a set of NTN CQI tables and not a set of TN CQI tables, or may store both a set of TN CQI tables and a set of NTN CQI tables in memory depending on a UE capability. For example, if the UE 120 supports both TN and NTN communications, then the UE 120 may store both the set of TN CQI tables and the set of NTN CQI tables in memory. As another example, if the UE 120 supports NTN communications and not TN communications, then the UE 120 may store the set of NTN CQI tables, and not the set of TN CQI tables, in memory. However, in some aspects, an NTN-only UE 120 may store both the set of NTN CQI tables and the set of TN CQI tables in memory if the type of CQI table to be used depends on a QoS requirement or a HARQ configuration, as described above. In some aspects, the configuration may include a CQI table indicator (such as an index value, a set of bits, or the like) that indicates a CQI table to be used. The UE 120 may use the CQI table indicator to identify the indicated CQI table in memory of the UE 120.

As shown, in some aspects, the set of TN CQI tables may include multiple TN CQI tables. Similarly, the set of NTN CQI tables may include multiple NTN CQI tables. Different CQI tables in a set of CQI tables may correspond to different parameters, such as different BLER targets, different sets of modulation schemes, different sets of code rates, different sets of spectral efficiencies, or the like. In some aspects, the UE 120 may select or be configured to use a CQI table, from a set of CQI tables, based at least in part on one or more of the above parameters.

In a fifth operation 425, the UE 120 may transmit CQI feedback to the base station based at least in part on the configuration. For example, the UE 120 may transmit the CQI feedback using the TN CQI table when the configuration indicates that the TN CQI table is to be used. Similarly, the UE 120 may transmit the CQI feedback using the NTN CQI table when the configuration indicates that the NTN CQI table is to be used. To transmit CQI feedback, the UE 120 may select a CQI index based at least in part on the identified CQI table and channel measurements, and may transmit the CQI index to the base station 110 (for example, as CQI feedback, in a CSI report, or the like). As described in more detail below in connection with FIG. 5, a set of CQI indexes from which the UE 120 can select a CQI index to be transmitted may be different for TN CQI tables as compared to NTN CQI tables. In other words, the TN CQI tables and the NTN CQI tables may have different CQI index granularities. As a result, the UE 120 may select a different CQI index for the same channel quality measurement depending on whether the UE 120 is configured to use a TN CQI table (which may result in a less accurate indication of channel quality, potentially using less signaling overhead) or an NTN CQI table (which may result in a more accurate indication of channel quality, potentially using more signaling overhead).

In a sixth operation 430, the base station 110 may interpret the CQI feedback based at least in part on the configuration. For example, when the configuration indicates that the UE 120 is to use an NTN CQI table, then the base station 110 may use that NTN CQI table to interpret the CQI feedback. As another example, when the configuration indicates that the UE 120 is to use a TN CQI table, the base station 110 may use that TN CQI table to interpret the CQI feedback. Other examples are provided above in connection with QoS requirements, a HARQ configuration, or the like. The base station 110 may store both TN and NTN CQI tables in memory.

The base station 110 may interpret the CQI feedback by determining an MCS that corresponds to a CQI index indicated in the CQI feedback. The base station 110 may transmit a data communication using the determined MCS, as described above in connection with FIG. 3.

By reporting CQI as described herein, a UE 120 may more accurately represent actual channel conditions for a non-terrestrial network, thereby reducing latency, increasing throughput, and improving spectral efficiency in a non-terrestrial network. Furthermore, a UE 120 may be flexibly configured with CQI reporting depending on various factors and using different granularities to permit co-existence between terrestrial networks and non-terrestrial networks.

Figure 5:
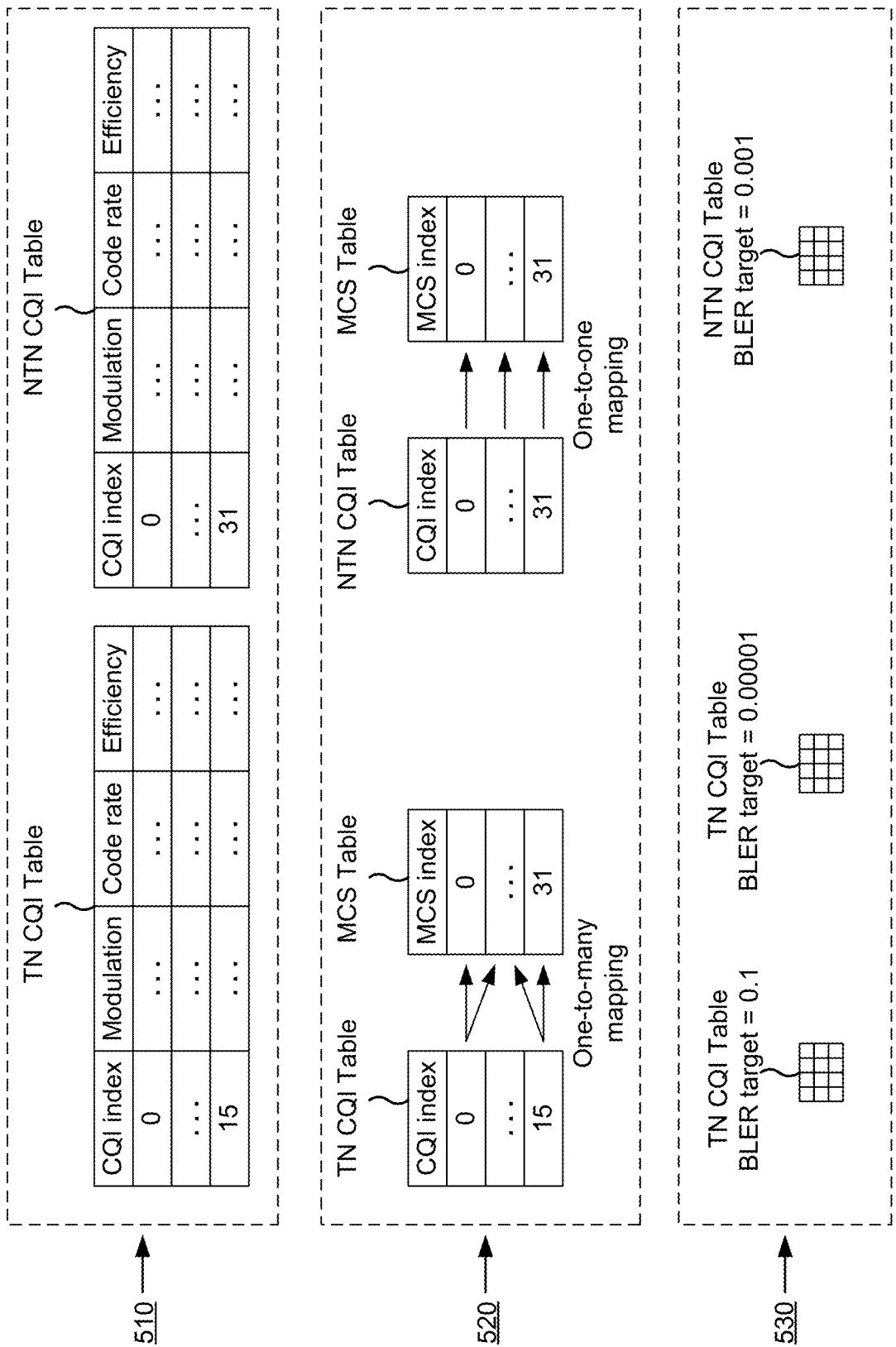

FIG. 5 is a diagram illustrating examples 510-530 of CQI feedback in a non-terrestrial network in accordance with various aspects of the present disclosure. Examples 510-530 are examples of how TN CQI tables and NTN CQI tables can be designed differently from one another to improve performance of TN communications and NTN communications, as described elsewhere herein.

In a first example 510, a TN CQI table may include fewer CQI indexes than an NTN CQI table. For example, the TN CQI table may include 16 CQI indexes, with one or more CQI indexes potentially being reserved. The NTN CQI table may include more than 16 CQI indexes. For example, the NTN CQI table may include 32 CQI indexes, with one or more CQI indexes potentially being reserved. As another example, the NTN CQI table may include 64 CQI indexes, 128 CQI indexes, or the like.

When the UE 120 reports CQI feedback, the number of bits used to indicate the CQI index may depend on the number of CQI indexes in a CQI table used by the UE 120. For example, when the UE 120 uses a TN CQI table that includes 16 CQI indexes, the UE 120 may report a CQI index using a four-bit value. As another example, when the UE 120 uses an NTN CQI table that includes 32 CQI indexes, the UE 120 may report a CQI index using a five-bit value. Similarly, a CQI index may be reported using a six-bit value when the CQI table includes 64 CQI indexes, may be reported using a seven-bit value when the CQI table includes 128 CQI indexes, and so on. Thus, when the TN CQI table includes fewer CQI indexes than an NTN CQI table, the UE 120 may use fewer bits to report CQI feedback using the TN CQI table as compared to a number of bits used to report CQI feedback when the NTN CQI table is used.

In a second example 520, the CQI indexes in the TN CQI table have a one-to-many mapping to corresponding MCS indexes in an MCS table. In this case, the MCS table includes more MCS indexes than a number of CQI indexes included in the TN CQI table. This may lead to less accurate MCS selection (but less signaling overhead) when the TN CQI table is used. As further shown, the CQI indexes in the NTN CQI table may have a one-to-one mapping to corresponding MCS indexes in an MCS table. In this case, each CQI index in the NTN CQI table may correspond to a single MCS index in the MCS table. Thus, the MCS table may include the same number of MCS indexes as a number of CQI indexes included in the NTN CQI table. This may lead to more accurate MCS selection (but more signaling overhead) when the NTN CQI table is used. In some aspects, rather than using a separate NTN CQI table that indicates a one-to-one mapping of CQI indexes to MCS indexes, the CSI report may include an MCS index instead of a CQI index. For example, the CQI indexes in an NTN CQI table, as described herein, may each be an MCS index in an MCS table. In this way, an MCS table may be reused rather than configuring or storing a separate NTN CQI table, thereby conserving memory.

In a third example 530, a TN CQI table may be associated with a different BLER target than an NTN CQI table. Additionally or alternatively, a set of BLER targets corresponding to a set of TN CQI tables may be different from a set of BLER targets corresponding to a set of NTN CQI tables. For example, a first TN CQI table may correspond to a BLER target of 0.1 (or 1e-1, such as for enhanced mobile broadband (eMBB) communications), and a second TN CQI table may correspond to a BLER target of 0.00001 (or 1e-5, such as for ultra-reliable low latency communications (URLLC)). As shown, an NTN CQI table may correspond to a BLER target of 0.001 (or 1e-3). As another example, an NTN CQI table may correspond to a BLER target of 0.000001 (or 1e-6). These different BLER targets for TN communications as compared to NTN communications may account for different HARQ configurations for TN communications as compared to NTN communications.

Figure 6:
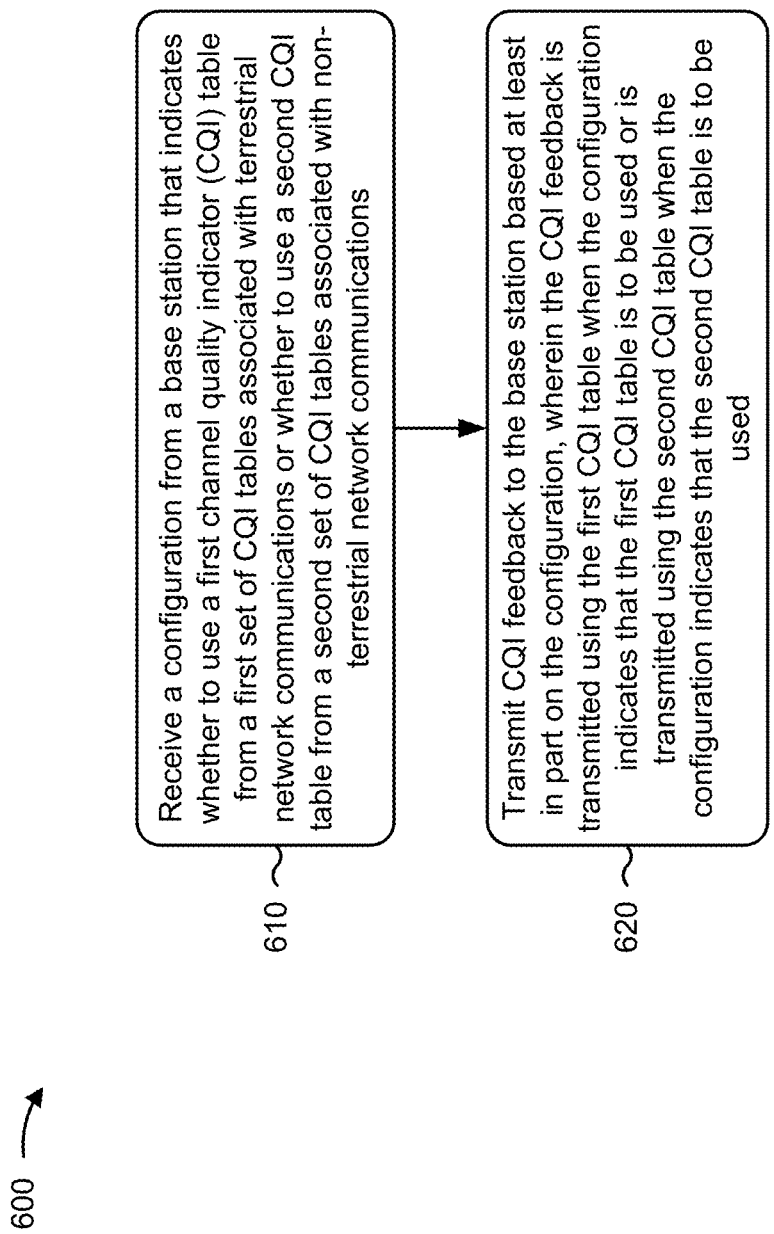
FIG. 6 is a diagram illustrating an example process performed by a UE in accordance with various aspects of the present disclosure.

FIG. 6 is a diagram illustrating an example process 600 performed, for example, by a UE in accordance with various aspects of the present disclosure. Example process 600 is an example where a UE (for example, UE 120 or the like) performs operations associated with channel quality indicator feedback in a non-terrestrial network.

As shown in FIG. 6, in some aspects, process 600 may include receiving a configuration from a base station that indicates whether to use a first CQI table from a first set of CQI tables associated with terrestrial network communications or whether to use a second CQI table from a second set of CQI tables associated with non-terrestrial network communications (block 610). For example, the UE (for example, using receive processor 258, controller/processor 280, memory 282, or the like) may receive a configuration from a base station that indicates whether to use a first CQI table from a first set of CQI tables associated with terrestrial network communications or whether to use a second CQI table from a second set of CQI tables associated with non-terrestrial network communications, as described above in connection with FIGS. 4 and 5.

As further shown in FIG. 6, in some aspects, process 600 may include transmitting CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used (block 620). For example, the UE (for example, using transmit processor 264, controller/processor 280, memory 282, or the like) may transmit CQI feedback to the base station based at least in part on the configuration, as described above in connection with FIGS. 4 and 5. In some aspects, the CQI feedback is transmitted using the first CQI table when the configuration indicates that the first CQI table is to be used or is transmitted using the second CQI table when the configuration indicates that the second CQI table is to be used.

Process 600 may include additional aspects, such as any single aspect or any combination of aspects described below or in connection with one or more other processes described elsewhere herein.

In a first aspect, the second CQI table includes at least one of more CQI indexes than the first CQI table, different MCS mappings than the first CQI table, an association with a different BLER target than the first CQI table, or a combination thereof.

In a second aspect, alone or in combination with the first aspect, the UE capability indicates whether the UE supports terrestrial network communications and not non-terrestrial network communications, whether the UE supports non-terrestrial network communications and not terrestrial network communications, or whether the UE supports both terrestrial network communications and non-terrestrial network communications.

In a third aspect, alone or in combination with one or more of the first and second aspects, the configuration is received based at least in part on transmitting the UE capability to the base station.

In a fourth aspect, alone or in combination with one or more of the first through third aspects, the first CQI table includes fewer CQI indexes than the second CQI table.

In a fifth aspect, alone or in combination with one or more of the first through fourth aspects, the CQI feedback includes fewer bits when the first CQI table is used to transmit the CQI feedback than a number of bits included when the second CQI table is used to transmit the CQI feedback.

In a sixth aspect, alone or in combination with one or more of the first through fifth aspects, the configuration is based at least in part on at least one of whether the UE is connected to a terrestrial network or a non-terrestrial network, a quality of service requirement for a data communication associated with the CQI feedback, a hybrid automatic repeat request (HARQ) configuration for the UE, or a combination thereof.

In a seventh aspect, alone or in combination with one or more of the first through sixth aspects, each CQI index in the second CQI table has a one-to-one mapping to a corresponding MCS index in an MCS table.

In an eighth aspect, alone or in combination with one or more of the first through seventh aspects, each CQI index in the second CQI table is an MCS index in an MCS table.

In a ninth aspect, alone or in combination with one or more of the first through eighth aspects, the first CQI table is associated with a different BLER target than the second CQI table.

In a tenth aspect, alone or in combination with one or more of the first through ninth aspects, the first set of CQI tables correspond to a first set of BLER targets and the second set of CQI tables correspond to a second set of BLER targets that is different from the first set of BLER targets.

In an eleventh aspect, alone or in combination with one or more of the first through tenth aspects, the configuration is cell-specific.

In a twelfth aspect, alone or in combination with one or more of the first through eleventh aspects, the configuration is UE group-specific.

In a thirteenth aspect, alone or in combination with one or more of the first through twelfth aspects, the configuration is UE-specific.

In a fourteenth aspect, alone or in combination with one or more of the first through thirteenth aspects, the configuration is indicated in an aperiodic CSI request.

In a fifteenth aspect, alone or in combination with one or more of the first through fourteenth aspects, the configuration is indicated in at least one of a system information block, a radio resource control message, downlink control information, a MAC-CE, or a combination thereof.

In a sixteenth aspect, alone or in combination with one or more of the first through fifteenth aspects, the configuration is indicated in at least one of a system information block, a radio resource control message, downlink control information, a medium access control (MAC) control element, or a combination thereof.

Figure 7:
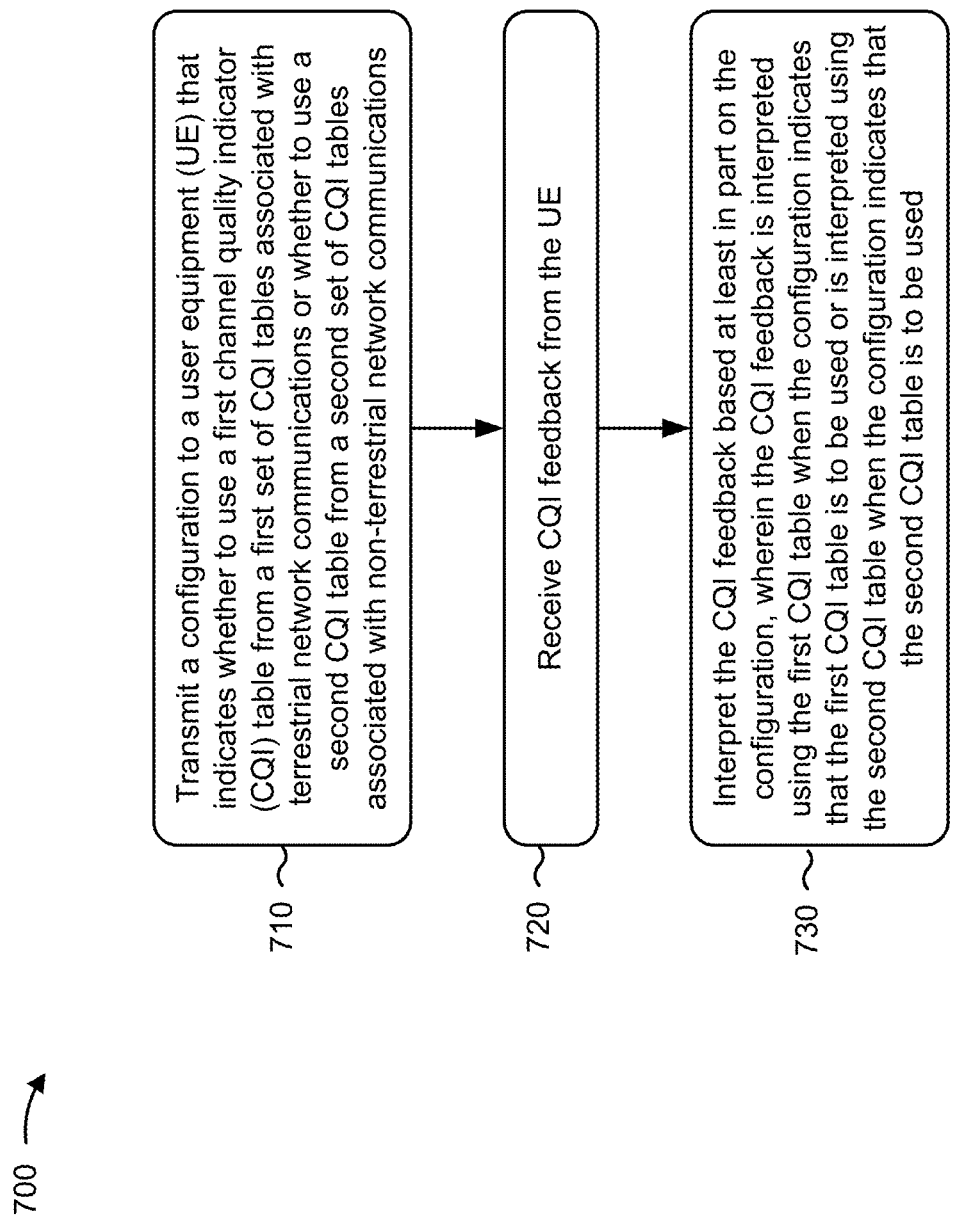
FIG. 7 is a diagram illustrating an example process performed by a BS in accordance with various aspects of the present disclosure.

FIG. 7 is a diagram illustrating an example process 700 performed, for example, by a base station in accordance with various aspects of the present disclosure. Example process 700 is an example where a base station (for example, base station 110 or the like) performs operations associated with channel quality indicator feedback in a non-terrestrial network.

As shown in FIG. 7, in some aspects, process 700 may include transmitting a configuration to a UE that indicates whether to use a first CQI table from a first set of CQI tables associated with terrestrial network communications or whether to use a second CQI table from a second set of CQI tables associated with non-terrestrial network communications (block 710). For example, the base station (for example, using transmit processor 220, controller/processor 240, memory 242, or the like) may transmit a configuration to a UE that indicates whether to use a first CQI table from a first set of CQI tables associated with terrestrial network communications or whether to use a second CQI table from a second set of CQI tables associated with non-terrestrial network communications, as described above in connection with FIGS. 4 and 5.

As further shown in FIG. 7, in some aspects, process 700 may include receiving CQI feedback from the UE (block 720). For example, the base station (for example, using receive processor 238, controller/processor 240, memory 242, or the like) may receive CQI feedback from the UE, as described above in connection with FIGS. 4 and 5.

As further shown in FIG. 7, in some aspects, process 700 may include interpreting the CQI feedback based at least in part on the configuration, wherein the CQI feedback is interpreted using the first CQI table when the configuration indicates that the first CQI table is to be used or is interpreted using the second CQI table when the configuration indicates that the second CQI table is to be used (block 730). For example, the base station (for example, using receive processor 238, controller/processor 240, memory 242, or the like) may interpret the CQI feedback based at least in part on the configuration, as described above in connection with FIGS. 4 and 5. In some aspects, the CQI feedback is interpreted using the first CQI table when the configuration indicates that the first CQI table is to be used or is interpreted using the second CQI table when the configuration indicates that the second CQI table is to be used.

Process 700 may include additional aspects, such as any single aspect or any combination of aspects described below or in connection with one or more other processes described elsewhere herein.

In a first aspect, the second CQI table includes at least one of more CQI indexes than the first CQI table, different MCS mappings than the first CQI table, an association with a different BLER target than the first CQI table, or a combination thereof.

In a second aspect, alone or in combination with the first aspect, process 700 includes receiving a UE capability that indicates whether the UE supports terrestrial network communications and not non-terrestrial network communications, whether the UE supports non-terrestrial network communications and not terrestrial network communications, or whether the UE supports both terrestrial network communications and non-terrestrial network communications.

In a third aspect, alone or in combination with one or more of the first and second aspects, process 700 includes determining the configuration based at least in part on the UE capability.

In a fourth aspect, alone or in combination with one or more of the first through third aspects, process 700 includes determining the configuration based at least in part on at least one of whether the base station is a terrestrial base station or a non-terrestrial base station, a quality of service requirement for a data communication associated with the CQI feedback, a HARQ configuration, or a combination thereof.

In a fifth aspect, alone or in combination with one or more of the first through fourth aspects, the first CQI table includes fewer CQI indexes than the second CQI table.

In a sixth aspect, alone or in combination with one or more of the first through fifth aspects, the CQI feedback includes fewer bits when the first CQI table is used to transmit the CQI feedback than a number of bits included when the second CQI table is used to transmit the CQI feedback.

In a seventh aspect, alone or in combination with one or more of the first through sixth aspects, each CQI index in the second CQI table has a one-to-one mapping to a corresponding MCS index in an MCS table.

In an eighth aspect, alone or in combination with one or more of the first through seventh aspects, each CQI index in the second CQI table is a MCS index in an MCS table.

In a ninth aspect, alone or in combination with one or more of the first through eighth aspects, the first CQI table is associated with a different BLER target than the second CQI table.

In a tenth aspect, alone or in combination with one or more of the first through ninth aspects, the first set of CQI tables correspond to a first set of BLER targets and the second set of CQI tables correspond to a second set of BLER targets that is different from the first set of BLER targets.

In an eleventh aspect, alone or in combination with one or more of the first through tenth aspects, the configuration is cell-specific.

In a twelfth aspect, alone or in combination with one or more of the first through eleventh aspects, the configuration is UE group-specific.

In a thirteenth aspect, alone or in combination with one or more of the first through twelfth aspects, the configuration is UE-specific.

In a fourteenth aspect, alone or in combination with one or more of the first through thirteenth aspects, the configuration is indicated in an aperiodic CSI request.

Figure 8:
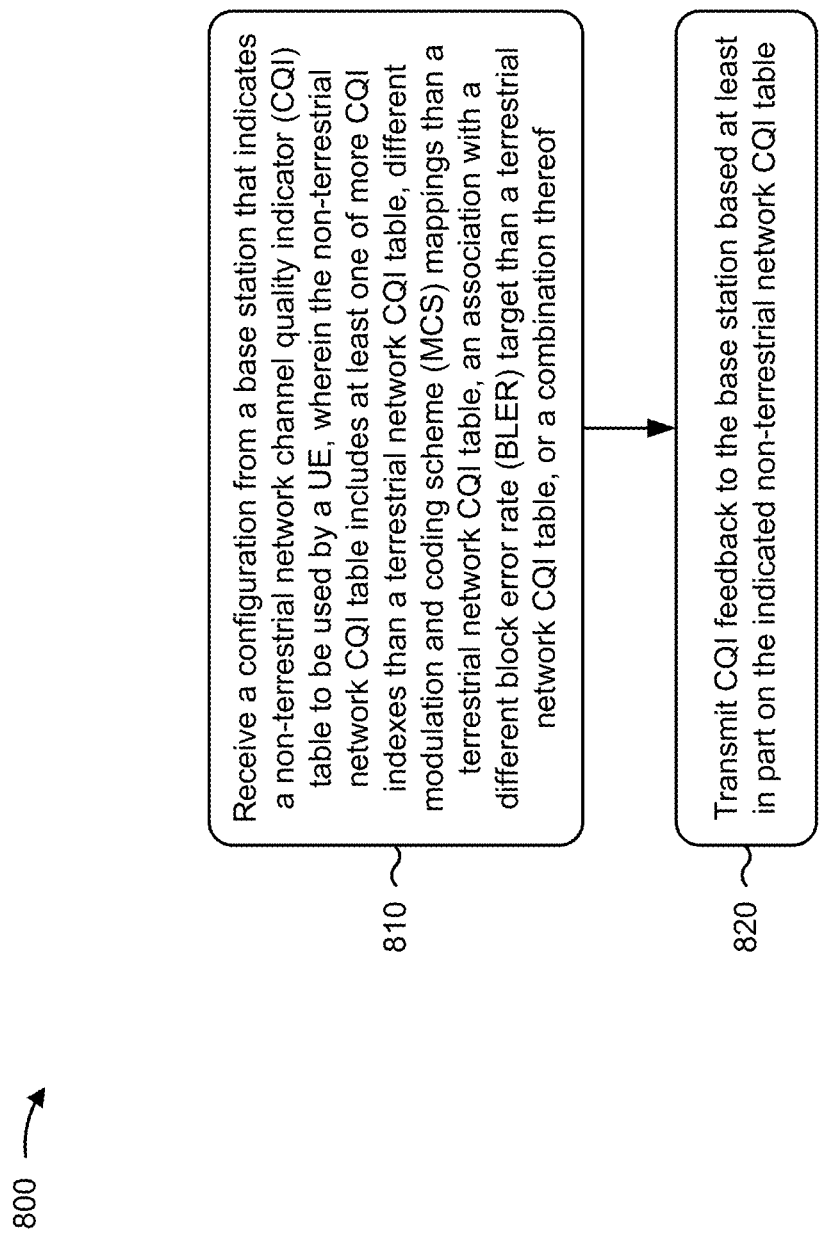
FIG. 8 is a diagram illustrating another example process performed by a UE in accordance with various aspects of the present disclosure.

FIG. 8 is a diagram illustrating an example process 800 performed, for example, by a UE in accordance with various aspects of the present disclosure. Example process 800 is another example where a UE (for example, UE 120 or the like) performs operations associated with channel quality indicator feedback in a non-terrestrial network.

As shown in FIG. 8, in some aspects, process 800 may include receiving a configuration from a base station that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof (block 810). For example, the UE (for example, using receive processor 258, controller/processor 280, memory 282, or the like) may receive a configuration from a base station that indicates a non-terrestrial network CQI table to be used by the UE, as described above in connection with FIGS. 4 and 5. In some aspects, the non-terrestrial network CQI table includes at least one of more CQI indexes than a terrestrial network CQI table, different MCS mappings than a terrestrial network CQI table, an association with a different BLER target than a terrestrial network CQI table, or a combination thereof.

As further shown in FIG. 8, in some aspects, process 800 may include transmitting CQI feedback to the base station based at least in part on the indicated non-terrestrial network CQI table (block 820). For example, the UE (for example, using transmit processor 264, controller/processor 280, memory 282, or the like) may transmit CQI feedback to the base station based at least in part on the indicated non-terrestrial network CQI table, as described above in connection with FIGS. 4 and 5.

Process 800 may include additional aspects, such as any single aspect or any combination of aspects described below or in connection with one or more other processes described elsewhere herein.

In a first aspect, the UE capability indicates whether the UE supports non-terrestrial network communications and not terrestrial network communications or whether the UE supports both terrestrial network communications and non-terrestrial network communications.

In a second aspect, alone or in combination with the first aspect, the configuration is received based at least in part on transmitting the UE capability to the base station.

In a third aspect, alone or in combination with one or more of the first and second aspects, the CQI feedback includes more bits than a number of bits included when CQI feedback is transmitted using a terrestrial network CQI table.

In a fourth aspect, alone or in combination with one or more of the first through third aspects, the configuration is based at least in part on at least one of whether the UE is connected to a terrestrial network or a non-terrestrial network, a quality of service requirement for a data communication associated with the CQI feedback, a HARQ configuration for the UE, or a combination thereof.

In a fifth aspect, alone or in combination with one or more of the first through fourth aspects, each CQI index in the non-terrestrial network CQI table has a one-to-one mapping to a corresponding MCS index in an MCS table.

In a sixth aspect, alone or in combination with one or more of the first through fifth aspects, each CQI index in the non-terrestrial network CQI table is an MCS index in an MCS table.

In a seventh aspect, alone or in combination with one or more of the first through sixth aspects, the non-terrestrial network CQI table is included in a set of non-terrestrial network CQI tables correspond to a first set of BLER that are different from a second set of BLER targets corresponding to a set of terrestrial network CQI tables.

In an eighth aspect, alone or in combination with one or more of the first through seventh aspects, the configuration is cell-specific.

In a ninth aspect, alone or in combination with one or more of the first through eighth aspects, the configuration is UE group-specific.

In a tenth aspect, alone or in combination with one or more of the first through ninth aspects, the configuration is UE-specific.

In an eleventh aspect, alone or in combination with one or more of the first through tenth aspects, the configuration is indicated in an aperiodic CSI request.

In a twelfth aspect, alone or in combination with one or more of the first through eleventh aspects, the configuration is indicated in at least one of a system information block, a radio resource control message, downlink control information, a MAC-CE, or a combination thereof.

Figure 9:
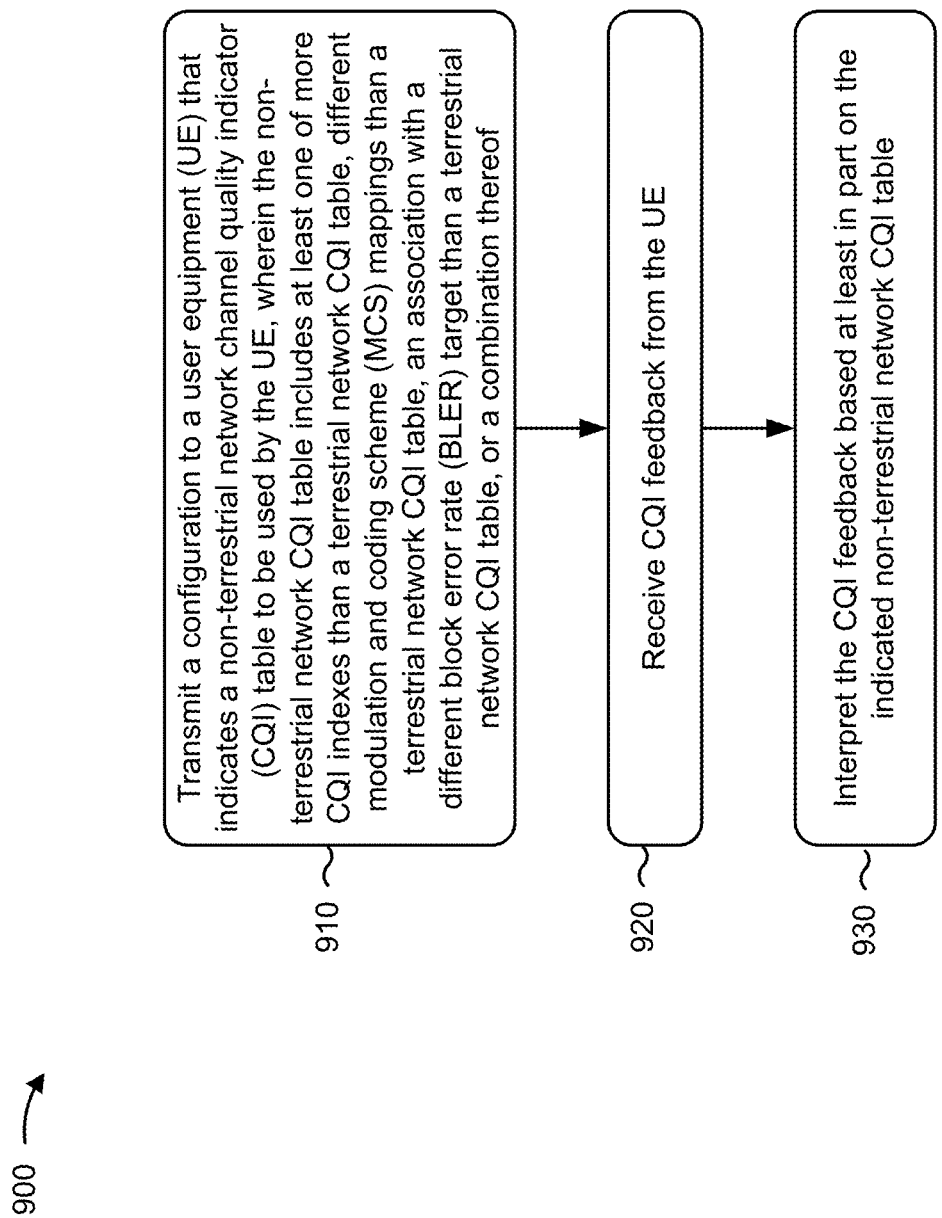
FIG. 9 is a diagram illustrating another example process performed by a BS in accordance with various aspects of the present disclosure.

FIG. 9 is a diagram illustrating an example process 900 performed, for example, by a base station in accordance with various aspects of the present disclosure. Example process 900 is another example where a base station (for example, base station 110 or the like) performs operations associated with channel quality indicator feedback in a non-terrestrial network.

As shown in FIG. 9, in some aspects, process 900 may include transmitting a configuration to a UE that indicates a non-terrestrial network CQI table to be used by the UE, wherein the non-terrestrial network CQI table includes at least one of more CQI indexes than a terrestrial network CQI table, different MCS mappings than a terrestrial network CQI table, an association with a different BLER target than a terrestrial network CQI table, or a combination thereof (block 910). For example, the base station (for example, using transmit processor 220, controller/processor 240, memory 242, or the like) may transmit a configuration to a UE that indicates a non-terrestrial network CQI table to be used by the UE, as described above in connection with FIGS. 4 and 5. In some aspects, the non-terrestrial network CQI table includes at least one of more CQI indexes than a terrestrial network CQI table, different MCS mappings than a terrestrial network CQI table, an association with a different BLER target than a terrestrial network CQI table, or a combination thereof.

As further shown in FIG. 9, in some aspects, process 900 may include receiving CQI feedback from the UE (block 920). For example, the base station (for example, using receive processor 238, controller/processor 240, memory 242, or the like) may receive CQI feedback from the UE, as described above in connection with FIGS. 4 and 5.

As further shown in FIG. 9, in some aspects, process 900 may include interpreting the CQI feedback based at least in part on the indicated non-terrestrial network CQI table (block 930). For example, the base station (for example, using receive processor 238, controller/processor 240, memory 242, or the like) may interpret the CQI feedback based at least in part on the indicated non-terrestrial network CQI table, as described above in connection with FIGS. 4 and 5.

Process 900 may include additional aspects, such as any single aspect or any combination of aspects described below or in connection with one or more other processes described elsewhere herein.

In a first aspect, process 900 includes receiving a UE capability that indicates whether the UE supports non-terrestrial network communications and not terrestrial network communications or whether the UE supports both terrestrial network communications and non-terrestrial network communications.

In a second aspect, alone or in combination with the first aspect, process 900 includes determining the configuration based at least in part on the UE capability.

In a third aspect, alone or in combination with one or more of the first and second aspects, the CQI feedback includes more bits than a number of bits included when a terrestrial network CQI table is indicated.

In a fourth aspect, alone or in combination with one or more of the first through third aspects, process 900 includes determining the configuration based at least in part on at least one of whether the base station is a terrestrial base station or a non-terrestrial base station, a quality of service requirement for a data communication associated with the CQI feedback, a HARQ configuration, or a combination thereof.

In a fifth aspect, alone or in combination with one or more of the first through fourth aspects, each CQI index in the non-terrestrial network CQI table has a one-to-one mapping to a corresponding MCS index in an MCS table.

In a sixth aspect, alone or in combination with one or more of the first through fifth aspects, each CQI index in the non-terrestrial network CQI table is an MCS index in an MCS table.

In a seventh aspect, alone or in combination with one or more of the first through sixth aspects, the non-terrestrial network CQI table is included in a set of non-terrestrial network CQI tables correspond to a first set of BLER that are different from a second set of BLER targets corresponding to a set of terrestrial network CQI tables.

In an eighth aspect, alone or in combination with one or more of the first through seventh aspects, the configuration is cell-specific.

In a ninth aspect, alone or in combination with one or more of the first through eighth aspects, the configuration is UE group-specific.

In a tenth aspect, alone or in combination with one or more of the first through ninth aspects, the configuration is UE-specific.

In an eleventh aspect, alone or in combination with one or more of the first through tenth aspects, the configuration is indicated in an aperiodic CSI request.

In a twelfth aspect, alone or in combination with one or more of the first through eleventh aspects, the configuration is indicated in at least one of a system information block, a radio resource control message, downlink control information, a MAC-CE, or a combination thereof.

Figure 10:
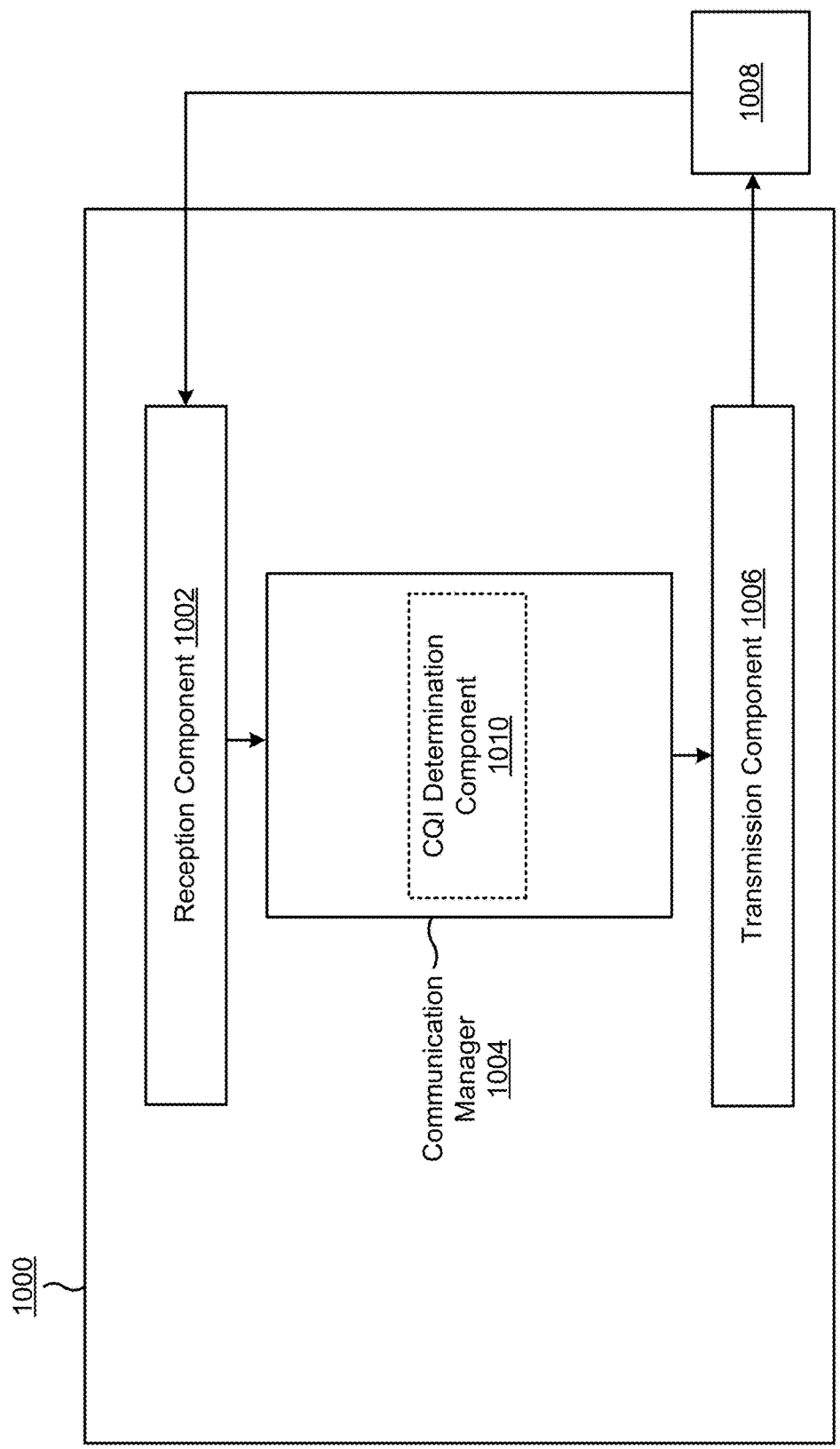
FIG. 10 is a block diagram of an example apparatus for wireless communication.

FIG. 10 is a block diagram of an example apparatus 1000 for wireless communication. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 3-5. Additionally or alternatively, the apparatus 1000 may be configured to perform one or more processes described herein, such as process 600 of FIG. 6, process 800 of FIG. 8, or a combination thereof. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be collocated with the reception component 1002 in a transceiver.

In some aspects, the communication manager 1004 receives or causes the reception component 1002 to receive a configuration that indicates whether to use a first CQI table from a first set of CQI tables associated with terrestrial network communications or whether to use a second CQI table from a second set of CQI tables associated with non-terrestrial network communications. In some aspects, the communication manager 1004 transmits or causes the transmission component 1006 to transmit CQI feedback based at least in part on the configuration. The CQI feedback may be transmitted using the first CQI table when the configuration indicates that the first CQI table is to be used, or may be transmitted using the second CQI table when the configuration indicates that the second CQI table is to be used.

Additionally or alternatively, the communication manager 1004 may receive or may cause the reception component 1002 to receive a configuration that indicates a non-terrestrial network CQI table to be used by the UE. The non-terrestrial network CQI table may include at least one of more CQI indexes than a terrestrial network CQI table, different MCS mappings than a terrestrial network CQI table, an association with a different BLER target than a terrestrial network CQI table, or a combination thereof. In some aspects, the communication manager 1004 transmits or causes the transmission component 1006 to transmit CQI feedback based at least in part on the indicated non-terrestrial network CQI table. In some aspects, the communication manager 1004 may include a controller/processor, a memory, or a combination thereof, of the UE described above in connection with FIG. 2.

In some aspects, the communication manager 1004 may include a set of components, such as a CQI determination component 1010. Alternatively, the set of components may be separate and distinct from the communication manager 1004. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The CQI determination component 1010 may determine one or more CQI parameters based at least in part on a configuration received from a base station, as described elsewhere herein. In some aspects, the CQI determination component 1010 determines one or more CQI parameters based at least in part on a non-terrestrial network CQI table, as described elsewhere herein.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
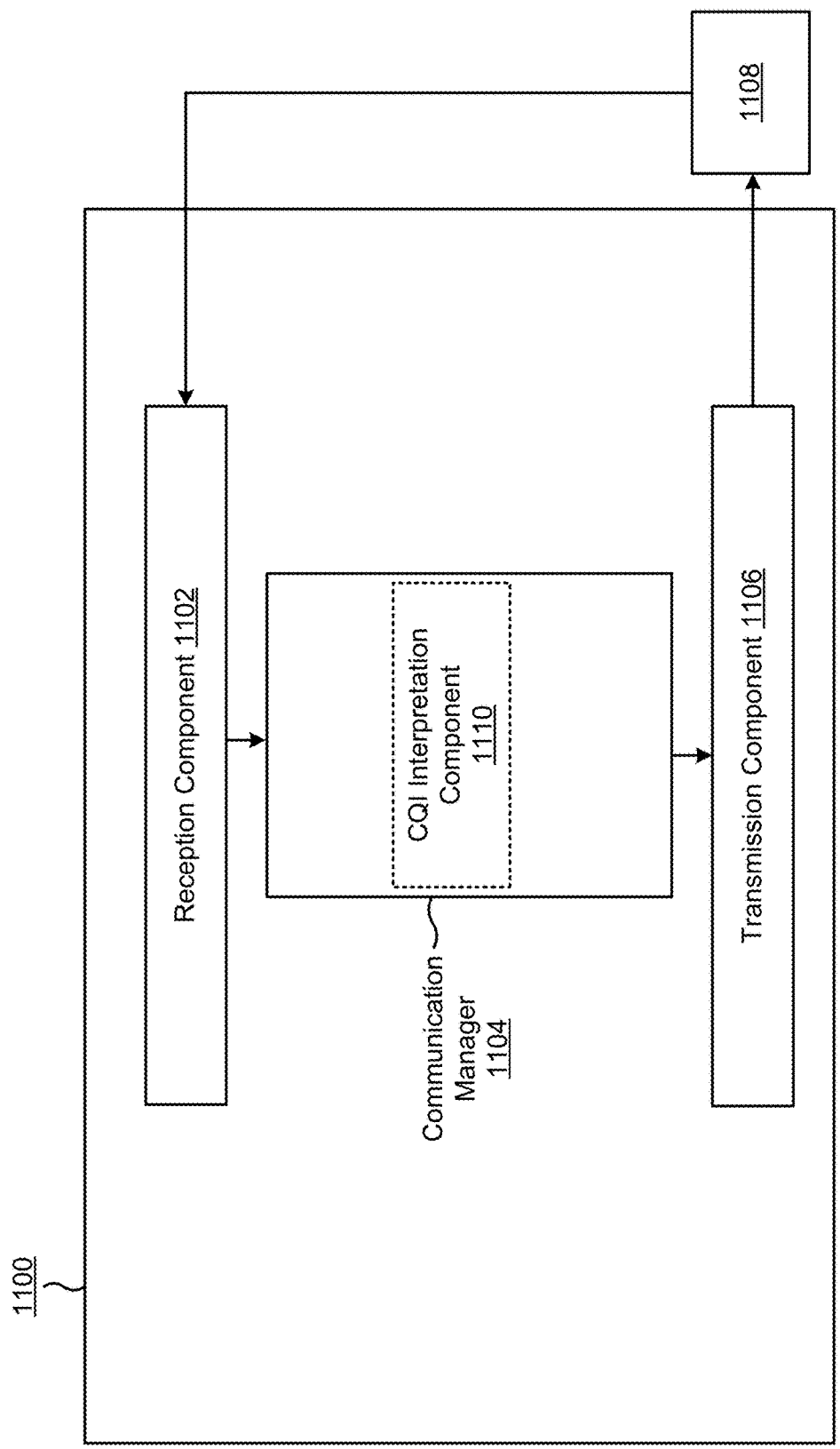
FIG. 11 is a block diagram of another example apparatus for wireless communication.

FIG. 11 is a block diagram of an example apparatus 1100 for wireless communication. The apparatus 1100 may be a base station, or a base station may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 3-5. Additionally or alternatively, the apparatus 1100 may be configured to perform one or more processes described herein, such as process 700 of FIG. 7, process 900 of FIG. 9, or a combination thereof. In some aspects, the apparatus 1100 may include one or more components of the base station described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be collocated with the reception component 1102 in a transceiver.

In some aspects, the communication manager 1104 transmits or causes the transmission component 1106 to transmit a configuration that indicates whether to use a first CQI table from a first set of CQI tables associated with terrestrial network communications or whether to use a second CQI table from a second set of CQI tables associated with non-terrestrial network communications. The communication manager 1104 may receive or may cause the reception component 1102 to receive CQI feedback. The communication manager 1104 may interpret the CQI feedback based at least in part on the configuration, wherein the CQI feedback is interpreted using the first CQI table when the configuration indicates that the first CQI table is to be used or is interpreted using the second CQI table when the configuration indicates that the second CQI table is to be used.

Additionally or alternatively, the communication manager 1104 may transmit or may cause the transmission component 1106 to transmit a configuration that indicates a non-terrestrial network CQI table. The non-terrestrial network CQI table may include at least one of more CQI indexes than a terrestrial network CQI table, different MCS mappings than a terrestrial network CQI table, an association with a different BLER target than a terrestrial network CQI table, or a combination thereof. The communication manager 1104 may receive or may cause the reception component 1102 to receive CQI feedback. The communication manager 1104 may interpret the CQI feedback based at least in part on the indicated non-terrestrial network CQI table. In some aspects, the communication manager 1104 may include a controller/processor, a memory, a scheduler, a communication unit, or a combination thereof, of the base station described above in connection with FIG. 2.

In some aspects, the communication manager 1104 may include a set of components, such as a CQI interpretation component 1110. Alternatively, the set of components may be separate and distinct from the communication manager 1104. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The CQI interpretation component 1110 may interpret CQI feedback based at least in part on a configuration. For example, the CQI interpretation component 1110 may interpret CQI feedback using the first CQI table when the configuration indicates that the first CQI table is to be used, or may interpret CQI feedback using the second CQI table when the configuration indicates that the second CQI table is to be used. In some aspects, the CQI interpretation component 1110 interprets CQI feedback based at least in part on non-terrestrial network CQI table indicated in the configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a configuration, from a base station and based on a UE capability of whether the UE supports one or both of terrestrial network communications or non-terrestrial network communications, that indicates whether to use a first channel quality indicator (CQI) table from a first set of CQI tables associated with terrestrial network communications or whether to use a second CQI table from a second set of CQI tables associated with non-terrestrial network communications; and
transmitting CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used.

2. The method of claim 1, wherein the second CQI table includes at least one of more CQI indexes than the first CQI table, different modulation and coding scheme (MCS) mappings than the first CQI table, an association with a different block error rate (BLER) target than the first CQI table, or a combination thereof.

3. The method of claim 1, further comprising transmitting the UE capability to the base station.

4. The method of claim 3, wherein the configuration is received based at least in part on transmitting the UE capability to the base station.

5. The method of claim 1, wherein the first CQI table includes fewer CQI indexes than the second CQI table.

6. The method of claim 1, wherein the CQI feedback includes fewer bits when the first CQI table is used to transmit the CQI feedback than a number of bits included when the second CQI table is used to transmit the CQI feedback.

7. The method of claim 1, wherein the configuration is based at least in part on at least one of whether the UE is connected to a terrestrial network or a non-terrestrial network, a quality of service requirement for a data communication associated with the CQI feedback, a hybrid automatic repeat request (HARQ) configuration for the UE, or a combination thereof.

8. The method of claim 1, wherein each CQI index in the second CQI table has a one-to-one mapping to a corresponding modulation and coding scheme (MCS) index in an MCS table.

9. The method of claim 1, wherein each CQI index in the second CQI table is a modulation and coding scheme (MCS) index in an MCS table.

10. The method of claim 1, wherein the first CQI table is associated with a different block error rate (BLER) target than the second CQI table.

11. The method of claim 1, wherein the first set of CQI tables correspond to a first set of block error rate (BLER) targets and the second set of CQI tables correspond to a second set of BLER targets that is different from the first set of BLER targets.

12. The method of claim 1, wherein the configuration is one of: cell-specific, UE group-specific, or UE-specific.

13. The method of claim 1, wherein the configuration is indicated in an aperiodic channel state information (CSI) request.

14. The method of claim 1, wherein the configuration is indicated in at least one of a system information block, a radio resource control message, downlink control information, a medium access control (MAC) control element, or a combination thereof.

15. A method of wireless communication performed by a user equipment (UE), comprising:
receiving a configuration, from a base station and based on a UE capability of whether the UE supports one or both of terrestrial network communications or non-terrestrial network communications, that indicates a non-terrestrial network channel quality indicator (CQI)

table to be used by the UE, wherein the non-terrestrial network CQI table includes at least one of more CQI indexes than a terrestrial network CQI table, different modulation and coding scheme (MCS) mappings than a terrestrial network CQI table, an association with a different block error rate (BLER) target than a terrestrial network CQI table, or a combination thereof; and transmitting CQI feedback to the base station based at least in part on the indicated non-terrestrial network CQI table.

16. The method of claim 15, further comprising transmitting the UE capability to the base station.

17. The method of claim 16, wherein the configuration is received based at least in part on transmitting the UE capability to the base station.

18. The method of claim 15, wherein the CQI feedback includes more bits than a number of bits included when CQI feedback is transmitted using a terrestrial network CQI table.

19. The method of claim 15, wherein the configuration is based at least in part on at least one of whether the UE is connected to a terrestrial network or a non-terrestrial network, a quality of service requirement for a data communication associated with the CQI feedback, a hybrid automatic repeat request (HARQ) configuration for the UE, or a combination thereof.

20. The method of claim 15, wherein each CQI index in the non-terrestrial network CQI table has a one-to-one mapping to a corresponding MCS index in an MCS table.

21. The method of claim 15, wherein each CQI index in the non-terrestrial network CQI table is an MCS index in an MCS table.

22. The method of claim 15, wherein the non-terrestrial network CQI table is included in a set of non-terrestrial network CQI tables corresponding to a first set of BLER targets that are different from a second set of BLER targets corresponding to a set of terrestrial network CQI tables.

23. The method of claim 15, wherein the configuration is one of: cell-specific, UE group-specific, or UE-specific.

24. The method of claim 15, wherein the configuration is indicated in an aperiodic channel state information (CSI) request.

25. The method of claim 15, wherein the configuration is indicated in at least one of a system information block, a radio resource control message, downlink control information, a medium access control (MAC) control element, or a combination thereof.

26. A user equipment (UE) for wireless communication, comprising:
a memory; and
one or more processors operatively coupled to the memory, the one or more processors configured to:
receive a configuration, from a base station and based on a UE capability of whether the UE supports one or both of terrestrial network communications or non-terrestrial network communications, that indicates whether to use a first channel quality indicator (CQI) table from a first set of CQI tables associated with terrestrial network communications or whether to use a second CQI table from a second set of CQI tables associated with non-terrestrial network communications; and
transmit CQI feedback to the base station based at least in part on the configuration, wherein the CQI feedback is transmitted using the first CQI table when the configuration indicates that the first CQI table is to be used or is transmitted using the second CQI table when the configuration indicates that the second CQI table is to be used.

27. The UE of claim 26, wherein the second CQI table includes at least one of more CQI indexes than the first CQI table, different modulation and coding scheme (MCS) mappings than the first CQI table, an association with a different block error rate (BLER) target than the first CQI table, or a combination thereof.

28. The UE of claim 26, wherein the UE is further configured to transmit a UE capability to the base station, wherein the UE capability indicates whether the UE supports terrestrial network communications and not non-terrestrial network communications, whether the UE supports non-terrestrial network communications and not terrestrial network communications, or whether the UE supports both terrestrial network communications and non-terrestrial network communications.

29. A user equipment (UE) for wireless communication, comprising:
a memory; and
one or more processors operatively coupled to the memory, the one or more processors configured to:
receive a configuration, from a base station and based on a UE capability of whether the UE supports one or both of terrestrial network communications or non-terrestrial network communications, that indicates a non-terrestrial network channel quality indicator (CQI) table to be used by the UE, wherein the non-terrestrial network CQI table includes at least one of more CQI indexes than a terrestrial network CQI table, different modulation and coding scheme (MCS) mappings than a terrestrial network CQI table, an association with a different block error rate (BLER) target than a terrestrial network CQI table, or a combination thereof; and
transmit CQI feedback to the base station based at least in part on the indicated non-terrestrial network CQI table.

30. The UE of claim 29, wherein the UE is further configured to transmit the UE capability to the base station.

* * * * *